(12) United States Patent
Gazdzinski et al.

(10) Patent No.: US 9,299,053 B2
(45) Date of Patent: *Mar. 29, 2016

(54) PORTABLE COMPUTERIZED WIRELESS APPARATUS

(71) Applicant: West View Research, LLC, San Diego, CA (US)

(72) Inventors: Mark J. Gazdzinski, Newark, DE (US); Robert F. Gazdzinski, San Diego, CA (US)

(73) Assignee: West View Research, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/606,959

(22) Filed: Jan. 27, 2015

(65) Prior Publication Data

US 2015/0242808 A1    Aug. 27, 2015

Related U.S. Application Data

(60) Division of application No. 13/761,077, filed on Feb. 6, 2013, now Pat. No. 9,033,226, which is a continuation of application No. 13/604,511, filed on Sep. 5, 2012, now Pat. No. 8,413,887, which is a (Continued)

(51) Int. Cl.
*G06K 15/00* (2006.01)
*G06Q 10/08* (2012.01)

(Continued)

(52) U.S. Cl.
CPC .......... *G06Q 10/0832* (2013.01); *G04G 21/025* (2013.01); *G04G 21/04* (2013.01); *G04G 21/06* (2013.01); *G06K 7/10297* (2013.01); *G06K 7/10366* (2013.01); *G06K 7/10425* (2013.01); *G06K 19/07762* (2013.01);

(Continued)

(58) Field of Classification Search
USPC ........................................ 235/383, 384, 375
See application file for complete search history.

(56) References Cited

U.S. PATENT DOCUMENTS 3,388,376 A    6/1968  Magee
3,733,608 A    5/1973  McGhay et al.

(Continued)

FOREIGN PATENT DOCUMENTS

DE    3440177 A1    5/1986
DE    197 09 518 C1    3/1998

(Continued)

OTHER PUBLICATIONS

DK. Kahaner (Mar. 16, 1991) "Hitachi 1991 Technology Exhibition, Tokyo," Asian Technology Information Program, pp. 1-14.

(Continued)

*Primary Examiner* — Ahshik Kim
(74) *Attorney, Agent, or Firm* — Gazdzinski & Associates, PC

(57) ABSTRACT

A mobile user apparatus useful for obtaining services wirelessly, such as for transfer of items or transport modalities to a prescribed location. In one embodiment, the mobile user apparatus is a wireless-enabled device which can cause transmission of a message to a third party to provide the desired service at a location previous specified by a global positioning system (GPS) or similar position determining apparatus of the user apparatus. In one variant, the user apparatus can communicate wirelessly with other user mobile devices to receive location information, and cause provision of the desired services at the received location.

204 Claims, 6 Drawing Sheets

Related U.S. Application Data continuation of application No. 13/421,713, filed on Mar. 15, 2012, now Pat. No. 8,371,503, which is a continuation of application No. 12/284,492, filed on Sep. 22, 2008, now Pat. No. 8,205,788, which is a continuation of application No. 11/015,384, filed on Dec. 16, 2004, now Pat. No. 7,427,024.

(60) Provisional application No. 60/530,812, filed on Dec. 17, 2003.

(51) Int. Cl.

| | | |
|---|---|---|
| *G07B 17/00* | (2006.01) | |
| *G07F 17/00* | (2006.01) | |
| *G07F 17/12* | (2006.01) | |
| *G07G 1/00* | (2006.01) | |
| *G06Q 20/32* | (2012.01) | |
| *H04W 4/00* | (2009.01) | |
| *G06Q 20/20* | (2012.01) | |
| *G06Q 20/36* | (2012.01) | |
| *G04G 21/02* | (2010.01) | |
| *G04G 21/04* | (2013.01) | |
| *G04G 21/06* | (2010.01) | |
| *G06K 19/077* | (2006.01) | |
| *G06Q 20/14* | (2012.01) | |
| *G06K 7/10* | (2006.01) | |
| *G06Q 10/02* | (2012.01) | |
| *H04W 4/02* | (2009.01) | |

(52) U.S. Cl.
CPC .............. *G06Q 10/02* (2013.01); *G06Q 10/08* (2013.01); *G06Q 10/083* (2013.01); *G06Q 10/0833* (2013.01); *G06Q 20/14* (2013.01); *G06Q 20/204* (2013.01); *G06Q 20/32* (2013.01); *G06Q 20/327* (2013.01); *G06Q 20/3278* (2013.01); *G06Q 20/363* (2013.01); *G07B 17/00193* (2013.01); *G07F 17/0014* (2013.01); *G07F 17/12* (2013.01); *G07G 1/009* (2013.01); *H04W 4/008* (2013.01); *H04W 4/02* (2013.01); *G07B 2017/00225* (2013.01)

(56) References Cited

U.S. PATENT DOCUMENTS

| | | |
|---|---|---|
| 4,050,063 A | 9/1977 | Schull |
| 4,075,632 A | 2/1978 | Baldwin et al. |
| 4,114,027 A | 9/1978 | Slater et al. |
| 4,251,798 A | 2/1981 | Swartz et al. |
| 4,360,798 A | 11/1982 | Swartz et al. |
| 4,369,361 A | 1/1983 | Swartz et al. |
| 4,387,297 A | 6/1983 | Swartz et al. |
| 4,401,971 A | 8/1983 | Saito et al. |
| 4,409,470 A | 10/1983 | Shepard et al. |
| 4,460,120 A | 7/1984 | Shepard et al. |
| 4,534,056 A | 8/1985 | Feilchenfeld et al. |
| 4,558,300 A | 12/1985 | Goldman |
| 4,577,177 A | 3/1986 | Marubashi |
| 4,623,874 A | 11/1986 | Thoma |
| 4,691,202 A | 9/1987 | Denne et al. |
| 4,692,769 A | 9/1987 | Gegan |
| 4,708,224 A | 11/1987 | Schrooder |
| 4,749,062 A | 6/1988 | Tsuji et al. |
| 4,819,174 A | 4/1989 | Furuno |
| 4,868,915 A | 9/1989 | Anderson, III |
| 4,926,182 A | 5/1990 | Ohta et al. |
| 4,935,962 A | 6/1990 | Austin |
| 4,954,959 A | 9/1990 | Moroto |
| 4,970,655 A | 11/1990 | Winn et al. |
| 4,979,593 A | 12/1990 | Watanabe et al. |
| 4,995,479 A | 2/1991 | Fujiwara et al. |
| 5,035,563 A | 7/1991 | Mezey |
| 5,038,283 A | 8/1991 | Caveney |
| 5,042,620 A | 8/1991 | Yoneda et al. |
| 5,053,774 A | 10/1991 | Schuermann et al. |
| 5,055,968 A | 10/1991 | Nishi et al. |
| 5,056,629 A | 10/1991 | Tsuji et al. |
| 5,079,411 A | 1/1992 | Lee |
| 5,086,450 A | 2/1992 | Kitagawa et al. |
| 5,121,407 A | 6/1992 | Partyka et al. |
| 5,155,689 A | 10/1992 | Wortham |
| 5,159,163 A | 10/1992 | Bahjat et al. |
| 5,182,570 A | 1/1993 | Nysen et al. |
| 5,200,583 A | 4/1993 | Kupersmith et al. |
| 5,202,552 A | 4/1993 | Little et al. |
| 5,255,341 A | 10/1993 | Nakajima |
| 5,274,560 A | 12/1993 | LaRue |
| 5,287,266 A | 2/1994 | Malec et al. |
| 5,293,029 A | 3/1994 | Iijima |
| 5,295,064 A | 3/1994 | Malec et al. |
| 5,304,786 A | 4/1994 | Pavlidis et al. |
| 5,319,181 A | 6/1994 | Shellhammer et al. |
| 5,320,561 A | 6/1994 | Cook et al. |
| 5,331,176 A | 7/1994 | Sant' Anselmo et al. |
| 5,334,974 A | 8/1994 | Simms |
| 5,374,930 A | 12/1994 | Schuermann |
| 5,406,490 A | 4/1995 | Braegas |
| 5,444,444 A | 8/1995 | Ross |
| 5,446,447 A | 8/1995 | Carney et al. |
| 5,448,110 A | 9/1995 | Tuttle et al. |
| 5,450,086 A | 9/1995 | Kaiser |
| 5,463,209 A | 10/1995 | Figh et al. |
| 5,465,099 A | 11/1995 | Mitsui et al. |
| 5,467,099 A | 11/1995 | Bonebright et al. |
| 5,485,897 A | 1/1996 | Matsumoto et al. |
| 5,491,484 A | 2/1996 | Schuermann |
| 5,491,715 A | 2/1996 | Flaxl |
| 5,512,910 A | 4/1996 | Murakami et al. |
| 5,528,222 A | 6/1996 | Moskowitz et al. |
| 5,537,105 A | 7/1996 | Marsh et al. |
| 5,539,775 A | 7/1996 | Tuttle et al. |
| 5,551,532 A | 9/1996 | Kupersmith |
| 5,555,286 A | 9/1996 | Tendler |
| 5,557,254 A | 9/1996 | Johnson et al. |
| 5,561,435 A | 10/1996 | Nalbandian et al. |
| 5,572,226 A | 11/1996 | Tuttle |
| 5,574,443 A | 11/1996 | Hsieh |
| 5,581,630 A | 12/1996 | Bonneau, Jr. |
| 5,584,070 A | 12/1996 | Harris |
| 5,591,956 A | 1/1997 | Longacre et al. |
| 5,598,534 A | 1/1997 | Haas |
| 5,604,143 A | 2/1997 | Ishida |
| 5,606,154 A | 2/1997 | Doigan et al. |
| 5,606,323 A | 2/1997 | Heinrich et al. |
| 5,613,783 A | 3/1997 | Kinney et al. |
| 5,621,412 A | 4/1997 | Sharpe et al. |
| 5,629,981 A | 5/1997 | Nerlikar |
| 5,638,425 A | 6/1997 | Meador et al. |
| 5,648,768 A | 7/1997 | Bouve |
| 5,649,296 A | 7/1997 | MacLellan et al. |
| 5,682,139 A | 10/1997 | Pradeep et al. |
| 5,682,143 A | 10/1997 | Brady et al. |
| 5,682,525 A | 10/1997 | Bouve |
| 5,689,094 A | 11/1997 | Friedli et al. |
| 5,701,121 A | 12/1997 | Murdoch |
| 5,710,884 A | 1/1998 | Dedrick |
| 5,712,625 A | 1/1998 | Murphy |
| 5,726,630 A | 3/1998 | Marsh et al. |
| 5,739,512 A | 4/1998 | Tognazzini |
| 5,742,509 A | 4/1998 | Goldberg et al. |
| 5,745,036 A | 4/1998 | Clare |
| 5,749,443 A | 5/1998 | Romao |
| 5,758,072 A | 5/1998 | Filepp et al. |
| 5,758,088 A | 5/1998 | Bezaire |
| 5,761,662 A | 6/1998 | Dasan |
| 5,773,806 A | 6/1998 | Longacre, Jr. |
| 5,774,859 A | 6/1998 | Houser |
| 5,790,946 A | 8/1998 | Rotzoll |
| 5,809,471 A | 9/1998 | Brodsky |
| 5,818,021 A | 10/1998 | Szewczykowski |
| 5,819,227 A | 10/1998 | Obuchi |

(56) References Cited

U.S. PATENT DOCUMENTS

| | | |
|---|---|---|
| 5,819,284 A | 10/1998 | Farber et al. |
| 5,842,145 A | 11/1998 | Zimmer |
| 5,844,181 A | 12/1998 | Amo et al. |
| 5,850,187 A | 12/1998 | Carrender et al. |
| 5,852,421 A | 12/1998 | Maldonado |
| 5,852,775 A | 12/1998 | Hidary |
| 5,859,628 A | 1/1999 | Ross |
| 5,887,139 A | 3/1999 | Madison, Jr. et al. |
| 5,892,441 A | 4/1999 | Woolley et al. |
| 5,894,266 A | 4/1999 | Wood, Jr. et al. |
| 5,900,808 A | 5/1999 | Lebo |
| 5,901,211 A | 5/1999 | Dean et al. |
| 5,903,317 A | 5/1999 | Sharir |
| 5,907,286 A | 5/1999 | Kuma |
| 5,908,469 A | 6/1999 | Botz et al. |
| 5,915,239 A | 6/1999 | Haavisto |
| 5,917,405 A | 6/1999 | Joao |
| 5,917,433 A | 6/1999 | Keillor et al. |
| 5,918,222 A | 6/1999 | Fukui et al. |
| 5,923,298 A | 7/1999 | Miyahara et al. |
| 5,926,624 A | 7/1999 | Katz |
| 5,932,853 A | 8/1999 | Friedli et al. |
| 5,943,624 A | 8/1999 | Fox et al. |
| 5,948,040 A | 9/1999 | DeLorme et al. |
| 5,955,710 A | 9/1999 | DiFranza |
| 5,959,357 A | 9/1999 | Korman |
| 5,960,074 A | 9/1999 | Clark |
| 5,979,757 A | 11/1999 | Tracy et al. |
| 5,983,073 A | 11/1999 | Ditzik |
| 5,983,161 A | 11/1999 | Lemelson et al. |
| 5,984,051 A | 11/1999 | Morgan et al. |
| 5,995,898 A | 11/1999 | Tuttle |
| 6,002,326 A | 12/1999 | Turner |
| 6,003,135 A | 12/1999 | Bialick |
| 6,009,403 A | 12/1999 | Sato |
| 6,010,074 A | 1/2000 | Kelly et al. |
| 6,011,839 A | 1/2000 | Friedli et al. |
| 6,016,476 A | 1/2000 | Maes et al. |
| 6,028,564 A | 2/2000 | Duan et al. |
| 6,032,089 A | 2/2000 | Buckley |
| 6,037,907 A | 3/2000 | Ha et al. |
| 6,040,745 A | 3/2000 | Tanaka et al. |
| 6,049,745 A | 4/2000 | Douglas et al. |
| 6,055,478 A | 4/2000 | Heron |
| 6,067,521 A | 5/2000 | Ishii |
| 6,069,648 A | 5/2000 | Suso |
| 6,073,118 A | 6/2000 | Gormish et al. |
| 6,073,727 A | 6/2000 | DiFranza et al. |
| 6,078,928 A | 6/2000 | Schnase et al. |
| 6,082,500 A | 7/2000 | Amo et al. |
| 6,091,417 A | 7/2000 | Lefkowitz |
| 6,091,956 A | 7/2000 | Hollenberg |
| 6,112,174 A | 8/2000 | Wakisaka |
| 6,115,611 A | 9/2000 | Kimoto et al. |
| 6,119,065 A | 9/2000 | Shimada |
| 6,122,580 A | 9/2000 | Autermann |
| 6,130,602 A | 10/2000 | O'Toole et al. |
| 6,134,549 A | 10/2000 | Regnier |
| 6,141,611 A | 10/2000 | Mackey |
| 6,144,301 A | 11/2000 | Frieden |
| 6,148,261 A | 11/2000 | Obradovich |
| 6,169,498 B1 | 1/2001 | King et al. |
| 6,173,279 B1 | 1/2001 | Levin |
| 6,177,872 B1 | 1/2001 | Kodukula et al. |
| 6,182,006 B1 | 1/2001 | Meek |
| 6,184,841 B1 | 2/2001 | Shober et al. |
| 6,188,956 B1 | 2/2001 | Walters |
| 6,192,222 B1 | 2/2001 | Greeff et al. |
| 6,201,544 B1 | 3/2001 | Ezaki |
| 6,202,008 B1 | 3/2001 | Beckert et al. |
| 6,202,023 B1 | 3/2001 | Hancock et al. |
| 6,202,799 B1 | 3/2001 | Drop |
| 6,206,142 B1 | 3/2001 | Meacham |
| 6,211,907 B1 | 4/2001 | Scaman |
| 6,223,160 B1 | 4/2001 | Kostka et al. |
| 6,230,082 B1 | 5/2001 | Harada |
| 6,230,136 B1 | 5/2001 | Yamamoto |
| 6,233,561 B1 | 5/2001 | Junqua |
| 6,236,836 B1 | 5/2001 | Westman et al. |
| 6,236,968 B1 | 5/2001 | Kanevsky et al. |
| 6,239,765 B1 | 5/2001 | Johnson et al. |
| 6,240,360 B1 | 5/2001 | Phelan |
| 6,240,365 B1 | 5/2001 | Bunn |
| 6,247,645 B1 | 6/2001 | Harris et al. |
| 6,249,740 B1 | 6/2001 | Ito et al. |
| 6,252,544 B1 | 6/2001 | Hoffberg |
| 6,259,891 B1 | 7/2001 | Allen |
| 6,266,614 B1 | 7/2001 | Alumbaugh |
| 6,275,231 B1 | 8/2001 | Obradovich |
| 6,285,317 B1 | 9/2001 | Ong |
| 6,305,604 B1 | 10/2001 | Ono |
| 6,317,027 B1 | 11/2001 | Watkins |
| 6,323,566 B1 | 11/2001 | Meier |
| 6,329,139 B1 | 12/2001 | Nova et al. |
| 6,331,825 B1 | 12/2001 | Ladner et al. |
| 6,332,127 B1 | 12/2001 | Bandera et al. |
| 6,335,685 B1 | 1/2002 | Schrott et al. |
| 6,341,668 B1 | 1/2002 | Fayette et al. |
| 6,349,797 B1 | 2/2002 | Newville et al. |
| 6,362,737 B1 | 3/2002 | Rodgers et al. |
| 6,397,976 B1 | 6/2002 | Hale et al. |
| 6,401,085 B1 | 6/2002 | Gershman et al. |
| 6,401,112 B1 | 6/2002 | Boyer |
| 6,405,126 B1 | 6/2002 | Palomo et al. |
| 6,411,212 B1 | 6/2002 | Hecht et al. |
| 6,411,874 B2 | 6/2002 | Morgan |
| 6,421,305 B1 | 7/2002 | Gioscia et al. |
| 6,438,561 B1 | 8/2002 | Israni |
| 6,442,530 B1 | 8/2002 | Miller |
| 6,460,036 B1 | 10/2002 | Herz |
| 6,466,232 B1 | 10/2002 | Newell et al. |
| 6,473,790 B1 | 10/2002 | Tagi |
| 6,477,152 B1 | 11/2002 | Heitt |
| 6,477,526 B2 | 11/2002 | Hayashi |
| 6,483,433 B2 | 11/2002 | Moskowitz et al. |
| 6,486,801 B1 | 11/2002 | Jones |
| 6,504,571 B1 | 1/2003 | Narayanaswami et al. |
| 6,507,279 B2 | 1/2003 | Loof |
| 6,522,875 B1 | 2/2003 | Dowling |
| 6,533,168 B1 | 3/2003 | Ching |
| 6,535,107 B1 | 3/2003 | Bartz |
| 6,557,758 B1 | 5/2003 | Monico |
| 6,564,143 B1 | 5/2003 | Alewine et al. |
| 6,567,122 B1 | 5/2003 | Anderson |
| 6,571,279 B1 | 5/2003 | Herz et al. |
| 6,583,713 B1 | 6/2003 | Bates |
| 6,587,835 B1 | 7/2003 | Treyz et al. |
| 6,594,580 B1 | 7/2003 | Tada et al. |
| 6,606,644 B1 | 8/2003 | Ford et al. |
| 6,611,691 B1 | 8/2003 | Zhou et al. |
| 6,622,083 B1 | 9/2003 | Knockeart |
| 6,628,336 B2 | 9/2003 | Hamamura |
| 6,636,566 B1 | 10/2003 | Roberts et al. |
| 6,636,748 B2 | 10/2003 | Monroe |
| 6,642,956 B1 | 11/2003 | Safai |
| 6,651,045 B1 | 11/2003 | Macaulay |
| 6,707,421 B1 | 3/2004 | Drury et al. |
| 6,712,276 B1 | 3/2004 | Abali et al. |
| 6,714,249 B2 | 3/2004 | May et al. |
| 6,725,200 B1 | 4/2004 | Rost |
| 6,732,077 B1 | 5/2004 | Gilbert |
| 6,754,485 B1 | 6/2004 | Obradovich |
| 6,760,757 B1 | 7/2004 | Lundberg |
| 6,771,981 B1 | 8/2004 | Zalewski et al. |
| 6,774,762 B2 | 8/2004 | Bates |
| 6,799,327 B1 | 9/2004 | Reynolds et al. |
| 6,801,792 B1 | 10/2004 | Schuster et al. |
| 6,806,808 B1 | 10/2004 | Watters et al. |
| 6,823,459 B1 | 11/2004 | Horikoshi et al. |
| 6,836,377 B1 | 12/2004 | Kislev et al. |
| 6,845,084 B2 | 1/2005 | Rangnekar |
| 6,847,490 B1 | 1/2005 | Nordstrom et al. |
| 6,866,195 B2 | 3/2005 | Knowles et al. |
| 6,884,213 B2 | 4/2005 | Raz et al. |

(56) References Cited

U.S. PATENT DOCUMENTS

| | | |
|---|---|---|
| 6,904,308 B2 | 6/2005 | Frisch et al. |
| 6,934,093 B2 | 8/2005 | Kislev et al. |
| 6,944,533 B2 | 9/2005 | Kozak et al. |
| 6,950,690 B1 | 9/2005 | Meron et al. |
| 6,965,863 B1 | 11/2005 | Zuberec |
| 6,975,941 B1 | 12/2005 | Lau et al. |
| 6,990,312 B1 | 1/2006 | Gioscia et al. |
| 6,994,253 B2 | 2/2006 | Miller et al. |
| 7,005,961 B2 | 2/2006 | Bates |
| 7,017,822 B2 | 3/2006 | Aisenbrey |
| 7,058,397 B2 | 6/2006 | Ritter |
| 7,065,492 B2 | 6/2006 | Cinquini et al. |
| 7,117,369 B1 | 10/2006 | Burns |
| 7,132,946 B2 | 11/2006 | Waldner et al. |
| 7,136,853 B1 | 11/2006 | Kohda et al. |
| 7,253,715 B2 | 8/2007 | Bates |
| 7,257,426 B1 | 8/2007 | Witkowski et al. |
| 7,305,345 B2 | 12/2007 | Bares et al. |
| 7,327,257 B2 | 2/2008 | Posamentier |
| 7,354,397 B2 | 4/2008 | Fujita et al. |
| 7,397,358 B2 | 7/2008 | Boothroyd |
| 7,515,953 B2 | 4/2009 | Madar et al. |
| 7,577,244 B2 | 8/2009 | Taschereau |
| 7,621,458 B2 | 11/2009 | Zellner et al. |
| 7,702,798 B2 | 4/2010 | Apreutesei et al. |
| 7,711,565 B1 | 5/2010 | Gazdzinski |
| 7,765,588 B2 | 7/2010 | Sahota et al. |
| 7,769,656 B1 | 8/2010 | Andrews et al. |
| 7,777,608 B2 | 8/2010 | Bates |
| 7,783,978 B1 | 8/2010 | Andrews et al. |
| 8,205,788 B1 * | 6/2012 | Gazdzinski ............ G06Q 10/08 235/375 |
| 8,275,617 B1 | 9/2012 | Morgan |
| 8,285,553 B2 | 10/2012 | Gazdzinski |
| 2001/0017649 A1 | 8/2001 | Yaron |
| 2001/0025341 A1 | 9/2001 | Marshall |
| 2002/0002467 A1 | 1/2002 | Ho |
| 2002/0032435 A1 | 3/2002 | Levin |
| 2002/0109774 A1 | 8/2002 | Meron et al. |
| 2002/0163443 A1 | 11/2002 | Stewart et al. |
| 2003/0016293 A1 | 1/2003 | Hamamura |
| 2003/0023523 A1 | 1/2003 | McKibben et al. |
| 2003/0050854 A1 | 3/2003 | Showghi et al. |
| 2003/0058345 A1 | 3/2003 | Morris et al. |
| 2003/0058354 A1 | 3/2003 | Parulski et al. |
| 2003/0095193 A1 | 5/2003 | May et al. |
| 2003/0114206 A1 | 6/2003 | Timothy et al. |
| 2003/0189094 A1 | 10/2003 | Trabitz |
| 2003/0195833 A1 | 10/2003 | Baranowski |
| 2004/0010430 A1 | 1/2004 | Cinquini et al. |
| 2004/0030601 A1 | 2/2004 | Pond et al. |
| 2004/0069852 A1 | 4/2004 | Seppinen et al. |
| 2004/0092825 A1 | 5/2004 | Madar et al. |
| 2004/0104842 A1 | 6/2004 | Drury et al. |
| 2004/0124982 A1 | 7/2004 | Kovach |
| 2004/0172262 A1 | 9/2004 | Gonzales et al. |
| 2004/0178912 A1 | 9/2004 | Smith et al. |
| 2004/0243518 A1 | 12/2004 | Clifton et al. |
| 2005/0024198 A1 | 2/2005 | Ward et al. |
| 2005/0239402 A1 | 10/2005 | Gioscia et al. |
| 2005/0278991 A1 | 12/2005 | Araujo |
| 2006/0069749 A1 | 3/2006 | Herz et al. |
| 2006/0202827 A1 | 9/2006 | Volpi et al. |
| 2006/0220868 A1 | 10/2006 | Takasawa et al. |
| 2007/0255838 A1 | 11/2007 | Hassan et al. |
| 2007/0273473 A1 | 11/2007 | Bates |
| 2007/0285207 A1 | 12/2007 | Bates |
| 2007/0285208 A1 | 12/2007 | Bates |
| 2007/0285213 A1 | 12/2007 | Bates |
| 2007/0290807 A1 | 12/2007 | Smith et al. |
| 2008/0201748 A1 | 8/2008 | Hasek |
| 2009/0077100 A1 | 3/2009 | Hancock et al. |
| 2009/0278688 A1 | 11/2009 | Tuttle |
| 2009/0289771 A1 | 11/2009 | Tuttle |
| 2010/0023392 A1 | 1/2010 | Merriman et al. |

FOREIGN PATENT DOCUMENTS

| | | |
|---|---|---|
| EP | 0829704 | 3/1998 |
| JP | 52018653 | 2/1977 |
| JP | S5218653 U | 2/1977 |
| JP | 57039237 | 3/1977 |
| JP | S59194261 A | 11/1984 |
| JP | 01226681 | 9/1989 |
| JP | H01-242374 | 9/1989 |
| JP | H0282889 A | 3/1990 |
| JP | H02-255487 | 10/1990 |
| JP | 03272977 | 12/1991 |
| JP | H04-292085 | 10/1992 |
| JP | 05017083 | 1/1993 |
| JP | 05058564 | 3/1993 |
| JP | 05201624 | 8/1993 |
| JP | HOS-193842 | 8/1993 |
| JP | H06-1549 | 1/1994 |
| JP | H07-295784 | 11/1995 |
| JP | H 11-17994 | 3/1996 |
| JP | H0861996 A | 3/1996 |
| JP | H08-223309 | 8/1996 |
| JP | H0970021 A | 3/1997 |
| JP | H10-49604 | 2/1998 |
| JP | H10-91176 | 4/1998 |
| JP | H10-133847 | 5/1998 |
| JP | H 10-164249 | 6/1998 |
| JP | H10-316318 | 12/1998 |
| JP | H11-11807 | 1/1999 |
| JP | H11118979 A | 4/1999 |
| JP | 2000-191245 | 7/2000 |
| JP | 2000289943 A | 10/2000 |
| JP | 2000289947 A | 10/2000 |
| WO | WO-9856589 A1 | 12/1998 |
| WO | WO-0058752 A1 | 10/2000 |

OTHER PUBLICATIONS

Karen Jacobs (Dec. 7, 1999) "Elevator Maker to Add Commercial Touch," The Wall Street Journal, pp. 1-2.

Lewis Perdue (Jul. 20, 1999) "Forget Elevator Music, Here Comes Elevator Internet," Internet VC Watch, pp. 1-2.

Stevens Institute of Technology, Spring 1999 Final Report, pp. 1-12.

Kenji Yoneda, et al. (Dec. 1997) "Multi-Objective Elevator Supervisory-Control System with Individual Floor-Situation Control," Hitachi Review, p. 1.

Haartsen J., "Bluetooth—The Universal Radio Interface for Ad Hoc," Wireless Connectivity, Ericson Review No. 3, 1998, pp. 110-117.

Huang Z., et al., "A New Location Coding Scheme for Intelligent Transportation System," ITS Journal, 1996, vol. 3 (2), pp. 99-109.

Oki N., et al., "Portable Vehicle Navigation System (NV-1 ): Its Features and Operability," IEEE, 1993, pp. 482-485.

Strauss H.J., "HyperMaps: Telling Your Users Where to Go," New Centerings in Computing Services, ACM SIGUCCS XVIII, 1990, pp. 377-389.

The What's New Magazine, Popular Science, VWGoA—Exhibit 1010, 1998, vol. 252 (3), pp. 5-7 & 54-55.

Buckley, The Car as a Peripheral, Adapting a Portable Computer to a Vehicle Intranet, SAE International 98C030, Oct. 19, 1998.

Chan, Next-Generation Wireless Data Services: Architecture and Experience, IEEE Personal Communications, Feb. 1999.

Meggers, A Multimedia Communication Architecture for Handheld Devices, IEEE, Sep. 1998.

Perkins, Mobile-IP, Ad-Hoc Networking, and Nomadicity, IEEE, Aug. 1996.

Pfeifer, Applying Location-Aware Computing for Electronic Commerce: Mobile Guide, Fifth Conference on Computer Communication, AFRICOMCCDC '98, Oct. 1998.

Buchholz, Trends in Electronics (Convergence '98), Automotive Engineering International, Dec. 1998.

Markoff, Daimler-Benz to Exhibit an Early-Stage Internet Car, N.Y. Times, Apr. 29, 1997.

Microsoft Comes to the Market, ITS International, Jan./Feb. 1998.

Meng, Wheels: A Conversational System in the Automobile Classifieds Domain, IEEE, Oct. 1996.

(56) References Cited

OTHER PUBLICATIONS

Krulwich, Multimedia Consumer Applications on the Information Superhighway, IEEE, 1994.
Meleis, The Future of Information Networks and Distributed Applications, IEEE, Apr. 1995.
Yankelovich, How Do Users Know What to Say?, Interactions, Nov./Dec. 1996.
Arditi, Interactive Tactile Maps, Visual Disability, and Accessibility of Building Interiors, Visual Impairment Research, Jan. 1999.
Gargiulo, Developing a Functional Wayfinding System from the Existing Signage System at Madigan Army Medical Center, May 1994.
Grize, Cybcerone, Interaction, Nov./Dec. 1997 17 Kraak, Integrating Multimedia in Geographical Information Systems, IEEE, 1996.
Brewster, Performance Evaluation of the Transmission of Image Data over Digital Networks Involving Mobile Terminals, IEEE, Apr. 1989.
Customized Touch-Screen Kiosks and Services, DynaTouch, Dec. 1999.
Freeman, Springfield's New Take on City Hall, Public Management, Jun. 1996.
Gross, Buildings, Memory and Wayfinding, EDRA 21, 1990.
Kahn, Real Space and Cyberspace, A Comparison of Museum Maps and Electronic Publication Maps, Museums and Interactive Multimedia, 1997.
Bryan, Man-Portable Networked Sensor System, Space and Naval Warfare Systems Center, Apr. 1998.
Inoue, Digital Mobile Communication System Designed for Nationwide Police Activities—WIDE System, IEEE, 1996.
Kay, STRIPE: Remote Driving Using Limited Image Data, Carnegie Mellon University, 1997.
Stumpf, Delivery and Test of the Digital Hardhat System at U.S. Army Corps of Engineers Fort Worth District Office, US Army Corps of Engineers, Dec. 1998.
Kempainen, In-car Computing Gets Personal, UBM LLC, Aug. 1998.
Mitchener, Focus on CeBIT: Cars May Turn to Information Superhighway—Computer Firms Envision Smart Vehicles Down the Road, Dow Jones & Company Inc., Mar. 1998.
Segarra, Escort Memories: A Key Technology Supporting the Automobile Life Cycle Processes, 1996.
1996 Lincoln Continental, http://www.autotrader.com/car-news/1996-lincoln-continental-218932 Automotive Immobilizer Anti-Theft Systems Experience Rapid Growth in 1999, PR News.
Buick XP 2000—Trends, Motor Trend, Jan. 1995.
Komanecky, IVHS Applications of Smart Cards, 1991.
Martin, Intel's Powerful PC Cuts Pizzazz in New Vehicles, Automotive Industry News, Feb. 1998.
Schmitz, A New State-of-the-Art Keyless Entry System, SAE International, Feb. 1998.
VDO Kienzle Fleet Manager 200 Product Manual, Nov. 1998.
Dias, Traveler's On-Line Information System—TOI: Information System and Location Modules, Third Joint European Conference & Exhibition on Geographical Information, 1997.
Noguchi, Intelligent Car—History and the Future in Japan and Toyota, 1998.
Abowd, Context-Awareness in Wearable and Ubiquitous Computing, IEEE, 1997.
Bourbakis, An Efficient Vehicles Navigation Methodology Using Dynamic Change in Local Maps, IEEE, Sep. 1995.
Glathe, The Prometheus Programme—Objectives, Concepts and Technology for Future Road Traffic, ATA, May 1990.
Minagawa, Open Architectural Car Multimedia Platform, 1998.
Shields, U.S. Trends in Navigable Digital Map Databases, IEEE 1994.
Sweeney, An Overview of Intelligent Vehicle Highway Systems (IVHS), IEEE, Sep. 1993.
Thoone, CARIN—A Car Information and Navigation System, Philips Technical Review, Dec. 1987.
Kamai, MONET—Compatible Car-Mounted Information Terminal, Fujitsu Ten Tech. J., Jun. 1998.
Crow, Wireless Local Area Networks, IEEE, Sep. 1997.
Julia, Cooperative Agents and Recognition Systems (CARS) for Drivers and Passengers, IEEE, Nov./Dec. 1998.
Crawford, Multimedia on the Move, Alpine Electronics Annual Review, 1998.
Rillings, Travtek, IVHS America, May 1992.
Kirson, The Evolution of Advance Development and Operational Test of a Probe-Based Driver Information System in an Arterial Street Network, IEEE, 1992.
Stein, ACCESS: A Computer-Simulated In-Vehicle A TIS Prototype Employing Synthetic Speech and Recognition, ITS America, Mar. 1995.
LaPierre, Personal Navigation System for the Visually Impaired, Carleton University, 1998.
Navigation Takes Direction, Twice Mobile Electronics, Jan. 1999.
Restivo, Mobile Drivers Feast on Devices Buffet, Computer Dealer News, Jan. 1999.
Sugimoto, Development of Toyota In-Vehicle Equipment for the VICS Demonstration Test, IEEE, 1994.
Zue, Toward Systems that Understand Spoken Language, IEEE, Feb. 1994.
Takahashi, Next, Let's Try Asking the Car, How Do Ya Get to Carnegie Hall?, Wall Street Journal, Feb. 1997.
Hemphill, Voice-Driven Information Access in the Automobile, 1998.
Honda, Information Services for Greater Driving Enjoyment, SAE International, Feb. 1998.
GM: "Network Vehicle," Normans Media, Feb. 1998.
Rillings, TravTek, SAE, 1991.
Delphi Teams with Saab to Exhibit Mobile Media Featuring Microsoft Windows CE-Based Auto PC, Feb. 1998.
Tanaka, On board System Devices for a Vehicle Information and Communication System, Fujitsu Ten Tech. J., 1995.
Zhao, Efficient and Reliable Data Transmission for Cellular-and-GPS Based Mayday Systems, IEEE, Nov. 1997.
Map'n'Go, AAA, 1998 (GARM-PRIART-007633-007654).
Map'n'Go, AAA, 1998 (GARM-PRIART-000318-000396).
Map'n'Go, Delorme (1998).
Delorme's New AAA Map'n'Go 4.0 Takes Family Fun on the Road, (GARM-PRIART-009006-009008) Interactive Electronics, Popular Science, Jun. 1996.
R. Vollmer, "Nutzungsgerechte Mobilkommunikation," User-Friendly Communication, Proceedings of the Congress Held in Munich, Mar. 12-13, 1990.
Hickman, The Internet on Wheels (PC Magazine Jul. 1997).
P. Festam, Clarion to build AutoPC using MS software, CNET News, (Jan. 8, 1998).
Clarion AutoPC 310C Owner's Manual, published in 1998 by Clarion Co. Ltd.
Clarion AutoPC brochure, published in 1998 by Clarion Sales Corporation.
Clarion AutoPC Quick Reference Guide, published in 1998 by Clarion Co. Ltd.
Odyssey Navigation Software for the Clarion Auto PC User Manual, published by InfoGation Corp., May 1999.
Odyssey Quick Reference Guide, published in 1999 by InfoGation Corp.
Odyssey Installation and Start-Up Guide, published in 1999 by InfoGation Corp.
Hemphill et al., Voice-Driven Information Access in the Automobile, SAE Paper 98C032, published Oct. 19, 1998.
Visteon's Mobile Office Solutions Give Busy Commuters More of What They Need—Time, Canada NewsWire, Financial News, Sep. 15, 1999.
G. Hertel, A Voice-Activated Co-Pilot: ICES, Smart Computing, val. 8, issue 1, Jan. 2000.
David Flynn, IBM's Corporate High Flier, The Sydney Morning Herald, Sep. 29, 1997.
Suzanne Kantra Kirschner, Wired Wheels, Popular Science, Mar. 1998.

(56) References Cited

OTHER PUBLICATIONS

U.S. Copyright Registration No. TX 4-900-822, "1998 IEEE/AIAA 17th Digital Avionics Systems Conference—Oct. 31, 1998—Bellevue, WA—(98CH36267)," dated—Dec. 8, 1998.

U.S. Copyright Registration No. TX 5-149-812, "November 1998 Quarterly Technical Papers on Microfiche (MICQ-N98)," dated Jun. 2, 2000.

Michelle Krebs, "Cars That Tell You Where to Go," The New York Times, Dec. 15, 1996.

"Acura Navigation System," Owners Manual for 1996 Acura RL.

Yeshwant Muthusamy, et al., Speech-Enabled Information Retrieval in the Automobile Environment, IEEE, Mar. 1999.

R. Lind, et al., The Network Vehicle—A Glimpse into the Future of Mobile Multi-Media, IEEE, Mar. 1998.

Presse-Information Hannover Messe '96, Infotainment Car.

The Network Vehicle Presentation, Delphi, Sun Microsystems, IBM, Netscape, Delco. Computer Dealers Exhibit Show, Las Vegas Nov. 1997.

R. Lind et al, The Network Vehicle—A Glimpse into the Future of Mobile Multi-Media, SAE Technical Paper Series, Nov. 1998.

R. Lind et al, The Network Vehicle—A Glimpse into the Future of Mobile Multi-Media, Systems Magazine, Sep. 1999.

Jost, Kevin, The Car as a Mobile-Media Platform, Automotive Engineering International, May 1998.

Altnether, J., In-Car Computing and Communication Enables Entertainment, Productivity and Information, Conference on ATT/ITS . . . 1997.

Intel Drives Connected Car PC Technology to Las Vegas Consumer Electronics Show, Intel News Release, Jan. 6, 1998.

Daimler-Benz Research and Technology previews first "Internet on Wheels" technology; future Mercedes-Benz drivers and passengers to accss Cyberspace . . . , Business Wire, Apr. 30, 1997.

Akhtar Jameel et. al. Internet Multimedia on Wheels: Connecting Cars to Cyberspace, IEEE, Jan. 1998.

Akhtar Jameel, et al. Web on Wheels: Toward Internet Enabled Cars, IEEE, Jan. 1998.

The New Universe!, Volkswagen Magazine, Dec. 1999.

Kreft, Wolfgang, Information and Communication Systems at Volkswagen, presentation from Automobile Electronics Conference, Nov. 1993.

Mapquest Launches Revolutionary GeoCentric Advertising Program Enabling Business to Provide Users Click on Destinations and Content, PR Newswire, Nov. 4, 1996.

\* cited by examiner

PORTABLE COMPUTERIZED WIRELESS APPARATUS

PRIORITY

This application is a divisional of and claims priority to co-owned and U.S. patent application Ser. No. 13/761,077 filed Feb. 6, 2013 entitled "PORTABLE COMPUTERIZED WIRELESS APPARATUS", now U.S. Pat. No. 9,033,226, which is a continuation of and claims priority to co-owned U.S. patent application Ser. No. 13/604,511 filed Sep. 5, 2012 entitled "PORTABLE COMPUTERIZED WIRELESS INFORMATION APPARATUS AND METHODS", now U.S. Pat. No. 8,413,887, which is a continuation of and claims priority to U.S. patent application Ser. No. 13/421,713 filed Mar. 15, 2012 and entitled "PORTABLE COMPUTERIZED WIRELESS PAYMENT APPARATUS AND METHODS", now U.S. Pat. No. 8,371,503, which is a continuation of and claims priority to co-owned U.S. patent application Ser. No. 12/284,492 filed Sep. 22, 2008 entitled "CHATTEL MANAGEMENT APPARATUS AND METHODS", now U.S. Pat. No. 8,205,788, which is a continuation of and claims priority to U.S. patent application Ser. No. 11/015,384 filed Dec. 16, 2004 and entitled "CHATTEL MANAGEMENT APPARATUS AND METHODS", now U.S. Pat. No. 7,427,024, which claims priority to U.S. Provisional Patent Application No. 60/530,812 entitled POINT-OF-DEPARTURE CHATTEL MANAGEMENT APPARATUS AND METHODS filed Dec. 17, 2003, each of the foregoing incorporated herein by reference in its entirety. This application is also related to co-owned U.S. patent application Ser. No. 13/727,306 filed Dec. 26, 2012 and entitled "COMPUTERIZED WIRELESS PAYMENT METHODS", now U.S. Pat. No. 8,613,390, Ser. No. 13/733,102 filed on Jan. 2, 2013 and entitled "COMPUTERIZED INFORMATION AND DISPLAY APPARATUS", now U.S. Pat. No. 8,690,050, Ser. No. 13/733,106 filed Jan. 2, 2013 and entitled "PORTABLE COMPUTERIZED WIRELESS PAYMENT APPARATUS AND METHODS", now U.S. Pat. No. 8,579,189, Ser. No. 13/738,671 filed Jan. 10, 2013 and entitled "PORTABLE COMPUTERIZED WIRELESS PAYMENT APPARATUS AND METHODS", now U.S. Pat. No. 8,622,286, and Ser. No. 13/756,984 filed Feb. 1, 2013 and entitled "PORTABLE COMPUTERIZED WIRELESS PAYMENT APPARATUS AND METHODS", now U.S. Pat. No. 8,640,944, Ser. No. 14/674,929 filed Mar. 31, 2015 and entitled "USER WEARABLE WIRELESS ENABLED ELECTRONIC APPARATUS"; Ser. No. 14/610,946 filed Jan. 30, 2015 and entitled "METHODS OF TRANSPORT OF ONE OR MORE ITEMS BETWEEN LOCATIONS", Ser. No. 14/616,559 filed Feb. 6, 2015 and entitled "COMPUTERIZED APPARATUS FOR TRANSFER BETWEEN LOCATIONS", Ser. No. 14/642,594 filed Mar. 9, 2015 and entitled "COMPUTERIZED APPARATUS AND METHODS FOR TRANSFER BETWEEN LOCATIONS" and Ser. No. 14/645,235 filed Mar. 11, 2015 and entitled "METHODS FOR SHIPPING ELEMENT PROCESSING", each also incorporated herein by reference in its entirety.

FIELD OF THE INVENTION

The present invention relates to improved methods and apparatus for the management, tracking and recovery of chattel at e.g., transportation facilities such as airports.

DESCRIPTION OF RELATED TECHNOLOGY

With the heightened level of security at airports and other facilities where large numbers of people gather, many passengers have personal or other items ("chattel"), such as pocket knives, tools, large belt buckles, wireless devices, personal security devices, etc., that are subject to confiscation by security personnel at the security checkpoint before proceeding further. Hence, the passengers or patrons are given the choice of either surrendering the items to the security personnel, or attempting to find some other mechanism for their safekeeping. Accordingly, airports and the like collect literally tons of such personal items each year since many people choose simply to surrender their items rather than having their progress impeded.

A number of different approaches to chattel (and baggage) tracking and management are present under the prior art. For example, United States Patent Publication No 20020163443 to Stewart, et al. published Nov. 7, 2002 entitled "Airport valet communication system" discloses an improved airport valet communication system. The system attaches a vehicle tag to a vehicle. A stall tag is also provided and is placed somewhere within the vicinity of a parking stall. To communicate with these two tags, a handheld computer is provided by the system for communicating with the vehicle tag via radio frequency communication to obtain an identification of the vehicle and for communicating with the stall tag via radio frequency communication to obtain an identification of the parking stall so as to correlate the vehicle and the parking stall in which the vehicle is parked.

United States Patent Publication No. 20030189094 to Trabitz, published Oct. 9, 2003 entitled "Baggage tracking system" discloses a passenger and baggage reconciliation system that employs non-programmable, passive transponder, radio frequency identification (RFID) tags attached to checked baggage, which enables continuity of reconciliation through any number of intra-air transfer points until the destination of the air travel is reached. If separation of the passenger and baggage occurs prior to the planned air travel destination, the system furnishes prompt notification to the airline. While enrollment of the passenger occurs upon payment for travel, checked baggage enrollment can occur variously outside the airport building (curbside), at the ticket counter, at the departure gate, on board the airplane, or along side the airplane prior to mounting the stairway or on the jet bridge. The interface to the airline carrier's computer reservation system (CRS) to obtain passenger and schedule data permits continuous tracking of passengers and baggage for the reconciliation process. The CRS creates a passenger name record (PNR) for each traveler, which contains fields for entering identification codes for checked baggage. Separate PNR fields and codes are used for each item of baggage that is checked. The PNR entry is obtained from reading the embedded identification number on the attached RFID tag when the baggage is checked in.

United States Patent Publication No. 20040010430 to Cinquini, et al. published Jan. 15, 2004 entitled "Method and apparatus for providing a personal item drop off/return service at security checkpoints" discloses an apparatus and method that provide a personal item return service to an owner of a personal item that is subject to confiscation before the owner is admitted through a security checkpoint and into a secure area downstream of the security checkpoint. The security checkpoint can be located at a transportation center (airport, bus or train) or any entrance to a secure area at a building or sports arena. The owner can purchase from a vending machine or kiosk a container having sufficient prepaid postage based on the size or weight of the item, and mail the item to a destination selected by the owner. The service is located adjacent to the security checkpoint so that the owner need not lose his/her place in the security line.

United States Patent Publication No. 20040124982 to Kovach published Jul. 1, 2004 entitled "Method for tracking and processing passengers and their transported articles" discloses a method for tracking and handling people and articles at an airport using Radio-Frequency Identification ("RFID") tags. The RFID tag contains an electronic microchip with a memory portion, permanently attached to a substrate having a planar antenna. Each RFID tag is tuned to operate at a specific frequency and includes a unique identifier number stored in the memory portion. Passenger-specific information, such as passenger name, address and flight itinerary may be sent to the microchip for storage in the memory portion by means of an RF field provided by an external "scanner" device. The scanner also provides a means for reading data stored in the memory portion of the microchip.

United States Patent Publication No. 20040243518 to Clifton, et al. published Dec. 2, 2004 entitled "Individual identity authentication system" discloses an individual identity authentication system for authenticating an identity of an individual includes a client computer system and a service provider computer system. The client computer system may be implemented at various locations, for example, airport terminals, so as to provide ready access for various users to authenticate the identity of a particular individual. The service provider computer system is in communication with the client computer system and executes code for causing the service provider computer system to perform a number of steps. One step includes receiving a personal identification number (PIN) and a social security number (SSN) of an individual that is entered into a secure terminal associated with the client computer system. Another step includes authenticating an identity of the individual when the entered PIN and the entered SSN correspond to a registered PIN and a registered SSN of the individual.

Despite the foregoing, there is still a salient need for flexible and efficient chattel management techniques and apparatus that provide the user (and in fact the facility operator) with a highly configurable and modular system that can be readily adapted to a number of different paradigms. Such improved techniques and apparatus would also ideally be compatible with existing and incipient personal electronics and networking technologies.

SUMMARY OF THE INVENTION

In a first aspect, a mobile apparatus is disclosed. In one embodiment, the apparatus includes: a processor; memory in data communication with the processor; a display device; a user interface configured to receive a selection of a desired service from a user; a global positioning system (GPS) receiver configured to generate information related to a current location of the mobile apparatus; and a software process operative to run on the processor.

In one variant, the process includes a plurality of instructions which are configured to, when executed, encode and transmit a message, the message being based at least on the selection and the information related to the current location. The message causes a provision by a third party of the desired service for the user at the current location.

In another embodiment, the mobile apparatus includes: a processor; a display device; a wireless interface in data communication with the processor; memory in data communication with the processor; a global positioning system (GPS) apparatus configured to generate information related to at least one location of the mobile apparatus; a user interface configured to receive an input from a user causing the apparatus to store the generated information related to the at least one location; and a software process operative to run on the processor.

In one variant, the process includes a plurality of instructions which are configured to, when executed, encode and transmit a message via the wireless interface, the message being based at least in part on the stored information. The message causes provision of a service by a third party at or proximate to the at least one location.

In another aspect, a mobile user apparatus is disclosed. In one embodiment, the apparatus includes: a data processing apparatus; a display device; a wireless interface in data communication with the data processing apparatus; storage apparatus in data communication with the processing apparatus; a global positioning system (GPS) apparatus; and a software process operative to run on the processor, the process comprising a plurality of instructions.

In one variant, the instructions are configured to, when executed: receive a message from a computerized device via the wireless interface, the message comprising location information relevant to a user of the computerized device; store at least a portion of the location information; and encode and transmit a second message, the second message being based at least in part on the stored information and causing provision of a service by a third party at or proximate to the location specified by the location information.

DESCRIPTION OF THE INVENTION

Figure 1:
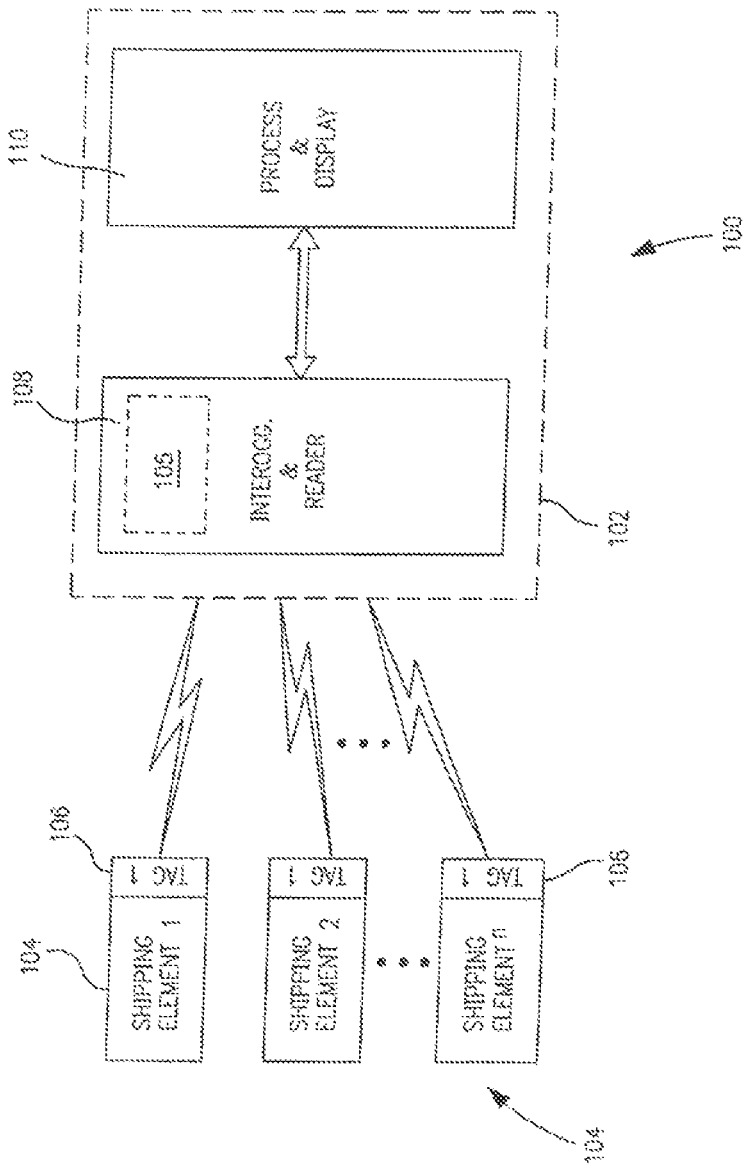
FIG. 1 is a block diagram of one exemplary embodiment of the chattel management system of the invention.

Reference is now made to the drawings listed above, wherein like numerals refer to like parts throughout.

As used herein, the terms "chattel" and "chattels" refers generally to any type of property or possession (regardless of ownership), which may generally be carried on or by a person (including within associated transport devices such as luggage, etc.). Chattel includes, without limitation, car keys, personal security devices (e.g., mace, pepper spray), knives, handguns, ammunition, tools, personal electronic devices, pharmaceuticals, cosmetics, jewelry, belt buckles or other metallized apparel, wrist watches, hats, cellular telephones, USB keys, glasses, magnetic or optical media, electric razors, personal computers, cameras, film, pagers, electronic games, purses, currency, iPods, etc.

As used herein, the term "passenger" shall mean any entity, whether human or otherwise, who utilizes a transportation modality.

As used herein, the term "transportation modality" refers to any form of transportation for either person, animals, and/or inanimate objects including, without limitation, aircraft, ships, ferries, land vehicles (buses, trains, cars, etc.), shuttles, etc.

As used herein, the term "computer program" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "application" refers generally to a unit of executable software that implements theme-based functionality The themes of applications vary broadly across any number of disciplines and functions (such as e-commerce transactions, shipping transactions, entertainment, calculator, Internet access, etc.), and one application may have more than one theme. The unit of executable software generally runs in a predetermined environment; for example and without limitation, the unit could comprise a downloadable Java Xlet™ that runs within the JavaTV™ environment.

As used herein, the term "database" refers generally to one or more tangible or virtual data storage locations, which may or may not be physically co-located with each other or other system components.

As used herein, the term "network" refers generally to data or communications networks regardless of type, including without limitation, LANs, WANs, intranets, internets, the Internet, cable systems, telecommunications networks, satellite networks, and Virtual Private Networks (VPNs), or collections or combinations thereof, whether based on wired, wireless, or matter wave modalities. Such networks may utilize literally any physical architectures and topologies (e.g. ATM, IEEE-802.3, X.25, Token Ring, SONET, 3G/3GPP/UMTS, 802.11, Hybrid fiber-coax (HFC), etc.) and protocols (e.g., TCP/IP, HTTP, FTP, WAP, GPRS, RTP/RTCP, WiFi, 3G, IEEE 802.11, etc.).

As used herein, the term "service provider" refers generally to services provided remotely to the user including, for example, data streaming, data analysis, financial account management and trading, data archiving and storage, Internet access, content delivery, telecommunications, etc.

As used herein, the term "speech recognition" refers to any methodology or technique by which human or other speech can be interpreted and converted to an electronic or data format or signals related thereto. It will be recognized that any number of different forms of spectral analysis (such as MFCC (Mel Frequency Cepstral Coefficients) or cochlea modeling, may be used. Phoneme/word recognition, if used, may be based on HMM (hidden Markov modeling), although other processes such as, without limitation, DTW (Dynamic Time Warping) or NNs (Neural Networks) may be used. Myriad speech recognition systems and algorithms are available, all considered within the scope of the invention disclosed herein.

As used herein, the term "CELP" is meant to include any and all variants of the CELP family such as, but not limited to, ACELP, VCELP, and QCELP. It is also noted that non-CELP compression algorithms and techniques, whether based on companding or otherwise, may be used. For example, and without limitation, PCM (pulse code modulation) or ADPCM (adaptive delta PCM) may be employed, as may other forms of linear predictive coding (LPC).

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "integrated circuit (IC)" refers to any type of device having any level of integration (including without limitation VLSI, VLSI, and LSI) and irrespective of process or base materials (including, without limitation Si, SiGe, CMOS and GAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "display" means any type of device adapted to display information, including without limitation CRTs, LCDs, TFTs, plasma displays, LEDs, and fluorescent devices.

Overview

The present invention allows users at a POD or other location to rapidly and easily ship their chattels to another location, such as to their travel destination or public gathering place (concert, amusement park, sporting event, etc.), to their home, or even a third party. As is known, millions of personal prohibited items are collected each year at airport security points alone. Faced with the choice of discard or abandoning the item(s) or canceling their travel, the great majority of people choose to abandon the chattel, or perhaps attempt to recover it later. Massive amounts of such items are collected each day throughout the nation's airports.

In its simplest form, the mechanism for shipment comprises a human agent and/or drop box akin to those used for Fedex or other comparable courier services, that is disposed adjacent to the security checkpoint of the POD. Standard courier methods are used, which may be aided through the use of more sophisticated apparatus and techniques so as to facilitate rapid and cost effective use by the customer. A variety of coding and/or tracking methods may be used, including bar codes, magnetic strips, and RFID tags of the general type well known in the art. These techniques may also be used in conjunction with one another, such as to perform different functions at different points throughout the processing or transit chain of the chattels.

In more sophisticated embodiment, personal electronics ranging from user-specific RFID devices, USB keys, PDAs, handhelds, cell phones or the like are used to transfer information to and/or from the kiosk or other processing entity associated with the service.

DESCRIPTION OF EXEMPLARY EMBODIMENTS

It is noted that while the system and methods of the invention disclosed herein are described with respect to point-of-departure (POD) management of chattels, such as might occur at an airport or other transportation facility, certain aspects of the invention may be useful in other applications, including, without limitation, other types of transaction relating to chattels, such as insuring or valuation thereof, courier services between two non-POD locations, etc.

Referring now to FIG. 1, a first embodiment of a system utilizing radio frequency identification (RFID) tags is described. The system 100 comprises generally one or more shipping elements 104 with associated tags 106, and a parent device 102 (e.g., kiosk). The kiosk 102 contains an RF antenna 105, as well as interrogator/reader module 108 and analysis/display module 110. It will be recognized by those of ordinary skill that the various components and modules being part of the system 100 may be combined or integrated into one physical device as applicable, or separated, modularized, or any combination thereof, the illustrated embodiment being merely exemplary.

The tags 106 of each shipping element comprise radio frequency ID tags (RFID). RFID tags are well known in the communications art. The main advantages of an RFID sensor and tag system over other forms of ID tagging include (a) the orientation of the tag with respect to the sensor is not critical for a correct read of the tag information; (b) communication can occur within comparatively harsh operating environments; and (c) the communication range between the sensor and tag can be significant even when the RF frequencies used are within the power limitations of Federal Communications Commission (FCC) rules concerning unlicensed transmitters. Accordingly, RFID technology is useful for several applications, especially those relating to asset inventory and management. RFID tags or various configurations are now ubiquitous and available at extremely low cost, thereby further enhancing the economic viability of the present invention.

The process of "reading" and communicating with an RFID tag such as that used in the system 100 of FIG. 1 comprises bringing a RFID tag within proximity to an RFID sensor ("reader") 108 which emanates a radio frequency or electric wake-up field having a limited range. The RFID tag 106 detects the presence of the wakeup field of the reader 108, and subsequently various forms or protocols of handshake occur between the tag 106 and the reader 108 in order to exchange data. All of this communication between the tag and the sensor is performed using, e.g., RF carriers (or even wideband waveforms) of one or more prescribed frequencies. As is well known in the art, so-called "low-frequency" systems operate in the kHz (e.g., 125 kHz) to low-MHz range (unlicensed). Low frequency systems are generally low cost and complexity and have comparatively limited range, but are attractive since the low frequency energy tends to suffer low losses from materials like metal, polymers, tissue, and the like. High-frequency systems operate in the low-MHz to GHz range (sometimes licensed). High-frequency systems in general have greater range, but are more directional. Additionally, the performance of these high frequency tags may be adversely affected by electromagnetic radiation or proximate metallic objects.

Additionally, RFID tags are generally categorized as being "active" (i.e., carry an associated power source for operation of the on-tag integrated circuit, and are capable of spontaneous transmission after reader interrogation), or "passive" which utilizes incident RF energy or electric field (from the reader, for example) to generate electrical energy for use by the IC, and transmission. Passive tags are highly energy efficient, and require only an extremely small amount of electrical power to function.

In the present application, due to the premium on space and desire for ultra-light weight and low cost, a small antenna and package form factor is desired. This also avoids disincentives to the disposability of the device (and its parent shipping element). Based on the foregoing considerations, the present embodiment of the invention utilizes a low frequency (e.g., 125 kHz nominal) miniature passive tag having a miniature monopole antenna 109 of the type well known in the art, although it will be recognized that active tag architectures, lower or higher frequency systems, and alternate antenna configurations (such as "FIG. 8" loop, etc.) may be used depending on the particular application and desired attributes. Passive tags are a preferred mode, yet active tags are a utilitarian and desirable mode as well for certain applications.

The RFID tag 106 of the present invention further optionally includes an integrated circuit (IC) device (not shown) including a transceiver section and processing logic, as well as an integrated random access memory (RAM) device of the type commonly available with such devices adapted to store a plurality of data bytes such as data correlating to the identity of a given user, its date of deposit, its location (i.e., Terminal A at Airport B), destination, urgency/priority, contents classification (e.g., metallic, hazardous, etc.), weight as deposited, user's destination (if different from the shipping destination), contact information, etc. and the like. The memory device may also comprise, without limitation, PROMS, EPROMS, EEPROMs, UVEPROMS, SRAMs, DRAMs, SDRAMS, "flash" memory, and ferroelectric memory devices. In this capacity, the construction of the parent shipping element 104 is simplified, and less complex "off the shelf" RFID devices meeting the physical space limitations may be used with little or no adaptation.

In an exemplary embodiment, the RFID tag is distributed on one or more surfaces of the shipping element using a capacitive type substrate tag. See for example the "Bistatix™" RFID devices previously manufactured by Motorola/Indala Corporation (now ASSA ABLOY). These devices utilize a very thin, lightweight and low cost substrate employing non-metallic printed circuit technology. They are also extremely rugged, allowing for bending, crumpling, folding, etc., and can be printed on many different types of dielectric substrates. They also utilize an extremely small IC, capable of storing a limited amount of data (e.g., 96 bits), thereby mitigating the costs associated with the shipping element 104, and its overall form factor. It will also be recognized that the shipping element surface(s) may be used as the substrate itself, thereby further reducing cost. In short, the "tag" can be printed and/or embedded onto or in the shipping element (box, envelope, carton, canister, etc.) at manufacture or thereafter in a highly cost-efficient manner. It will be recognized that capacitive or inductive tags may be used consistent with the invention.

Hence, by employing this (e.g., Bistatix) technology within the element 104 of the present invention, the RFID tag may be disposed on any surface at extremely low cost and low profile. A complementary Motorola Bistatix reader may be used as the reader 108 of FIG. 1, although other configurations may be used as described elsewhere herein.

In operation, the tag "reader" 108 of FIG. 1 interrogates the element(s) 104 and RFID device 106 at its designated frequency, causing the tag to "wake" and initiate communications protocols disposed within the tag IC/memory. Once such protocols are established, the reader transmits preformatted data representative of the parameters desired to be loaded into the RFID memory device. For, example, a box of "smart" envelopes 200 (described below with respect to FIG. 2a) can be swiped by the interrogator/reader 108 before use in the kiosk and encoded with identifying information, such as for example the airport/POD identification code, date of coding, etc. The envelopes or other elements 200 can optionally be sequentially encoded with numbers (e.g., envelope No. 1, 2, 3, etc.) to distinguish one from another. Alternatively, the tags 106 associated with the elements 200 can be pre-coded at manufacture, such as via slightly variant frequency of emission, etc. A variety of different approaches for distinguishing between two similarly situated shipping elements are well known to those of ordinary skill in the RFID arts, and accordingly are not described further herein.

As can be readily appreciated, the ability to uniquely identify a plurality of different shipping elements 104 using RF technology has great implications for, inter alia, accounting for such elements during use, security scanning and shipment. Herein lies a primary attribute or feature of the present invention; i.e., tracking and control of a number of different parcels or elements 104. For example, the present invention allows the system operator to rapidly inventory and specifically identify particular elements 104 before shipment, and afterwards (i.e., during delivery to the user or designated recipient), thereby easily and efficiently accounting for all elements 104. This is also useful during security scanning, and inventory before loading on the selected transportation mode (aircraft, etc.); e.g., to verify that no one such as a terrorist has surreptitiously inserted a "dummy" package into the transport bin or other mechanism between unloading of the kiosk and loading onto the aircraft. It will also be recognized, however, that the kiosk or other receptacle (or portion thereof) may simply be made mobile and securable such that it can be directly transferred to the aircraft without having to load or unload, thereby potentially frustrating attempts to gain unauthorized access thereto.

The RFID tags 106 of the embodiment of FIG. 1 has further utility for conducting inventory of "smart" shipping elements after manufacture. Since each element carries it's own tag, each capable of uniquely identifying itself (whether by unique frequency assignment, or data encoded on the tag memory and transmitted to the reader), rapid reading of a plurality of tags disposed in close proximity to one another is possible. For example, a manufacturer, distributor or POD could also use the system 100 of the present invention to control inventory (such as by placing a reader at a "choke point" of a storage facility, thereby knowing precisely when each "smart" element 104 was brought in or out of the facility), or determine when a re-order of supplies is needed. Using the wireless data interface capabilities described subsequently herein, the kiosk can even automatically alert a supplier that it needs more shipping elements, akin to well known prior art CDPD approaches used for, inter alia, vending machines.

In yet another embodiment, the tag reader 108 is placed at the door or portal to the room or space (e.g., airport ingress/egress) by which a subject must pass, thereby necessarily exposing the subject to the interrogation field generated by the reader 108. Hence, where someone such as a terrorist attempts to obtain one or more elements 104 for unauthorized use (such as to try to sneak a package into a bin of authorized elements 104) from the kiosk, a security perimeter is established and interrogation automatically conducted. This security perimeter can be quite small, such that anyone attempting to steal or smuggle in coded envelopes or containers 104 from the kiosk will trigger a proximity sensor based on the aforementioned interrogation.

Another feature of the present invention is coordination of the type of tag used, its frequency, its radiated power, etc., thereby allowing the user to control the range at which the interrogation field generated by the reader 108 will elicit a response from the tag 106. It is undesirable to have the tags 106 respond at too great a distance, since this would necessitate removing the shipping elements in question and the reader 108 from the proximity of other devices in order to perform an inventory (i.e., the user would not be able to spatially differentiate between various tagged shipping elements 104). Hence, the aforementioned low-power low-frequency passive tag is well suited to such applications. In the exemplary embodiment, the foregoing parameters are controlled such that the tag reader 108 has an effective "wake up" range of 1-3 ft., thereby allowing sufficient spatial resolution; however, this value can clearly be adjusted as need in the particular application. For example, in the "exit door" reader embodiment described elsewhere herein, a wake-up field lobe having a main axis of 5-10 feet may be needed to ensure adequate tag coverage as personnel ingress/egress.

The RFID tag 106 and reader 108 of the present invention, as well as other wireless or wired data links associated with the apparatus 100, may also optionally utilize an encrypted data protocol, such that any transmissions from the tag 106 are encrypted, and accordingly must be decrypted by the authorized reader 108 before processing of the tag data, and/or writing of the tag 106 by the reader 108, is permitted. Such encryption may be applied using any number of well known techniques instituted at the protocol level, or even at the air interface. For example, in one embodiment, the RFID tag 106 and reader 108 comprise more complex variant having a direct sequence spread spectrum (DSSS) communication system incorporating a PN (pseudo-noise) spreading code of the type well known in the communications art. In another embodiment, a frequency hopping spread spectrum (FHSS) having a hopping sequence is used to enhance security. The use of multi-bit encryption/encrypted data protocols and spread spectrum techniques for security is well known in the art, and accordingly will not be described further herein. See U.S. Pat. No. 5,539,775 entitled "Modulated spread spectrum in RF identification systems method" issued Jul. 23, 1996, and U.S. Pat. No. 5,629,981 entitled "Information management and security system" issued May 13, 1997, both incorporated herein by reference in their entirety.

In addition or instead of the air interface, encryption may also be applied at the protocol level, such as where public/private key methods, IKE, IPSec, or other techniques may be used to frustrate surreptitious interception or alteration of data transmitted to/from the RFID device, or between other components. Furthermore, well known VPN or other tunneling protocols for encapsulating data during transmission across an untrusted network may be used between various entities of the present system, such as between a kiosk and a local distribution or management node.

Additionally, well known secure socket layer (SSL) or equivalent approaches may be employed across one or more links of the network(s), so as to enhance security.

It will be appreciated that many different variations and combinations of the foregoing radio frequency communications apparatus and methods may be employed consistent with the invention; such different variations and combinations being too numerous to describe herein. All such variations and combinations, however, are easily recognized and within the possession of those of ordinary skill.

As shown in FIG. 1, the receptacle module 110 takes the data obtained from the tags 106 via reader 108 and analyzes it according to one or more algorithms. In the illustrated embodiment, the module 110 comprises a CISC or RISC processor having one or more computer programs running thereon, the programs analyzing the digitized tag data and for example, comparing it to stored data representing a series of allowed or authorized ID values for shipping elements 104, hence enhancing security. The receptacle can also be selectively locked until the reader 108 and module 110 validate the authenticity or other information associated with the particular transaction (including, e.g., user payment authorization, maximum allowed weight, size restrictions, etc.). To this end, the kiosk can be configured with an electronic scale integrated with the tag reader 108, or other complementary systems. In terms of size, the code of each shipping element 104 advantageously helps the system automatically determine the maximum size of the package; i.e., the family designation of each element 104, when read by the reader 108, tells the central processor that the package cannot physically be larger than certain dimensions.

It will further be recognized that each item of inventory or shipment can have associated with it other descriptive data, as shown in the example below:

| ID Code | Category | Description | Owning entity | Transaction date | Routing Number |
|---|---|---|---|---|---|
| 0001 | Airport POD Shipping | 10 × 12 Envelope | PHL/A | Dec. 25, 2003 | 0000-1111-2222-3333 |

This descriptive data can, in whole or part, also be produced during a discrepancy alert (or when merely performing a normal transaction) to help identify the item in question.

As can be appreciated, the analysis/display functionality of the module 110 may also be provided by or integrated with another device. For example, so as to reduce clutter or space requirements, an existing device such as a Fedex or Airborne drop box, ATM machine, Internet or WiFi kiosk, flight insurance kiosk, etc. may be used as the parent platform for the reader 108 and/or module 110. Many existing devices include sufficient processing and storage capacity to perform the transaction processing function(s) along with those normally required by that equipment, and hence can be readily programmed or otherwise adapted by those of ordinary skill to accommodate the functionality described herein. As yet another alternative, a standard desktop or laptop PC, or airport boarding gate terminal may be used to provide the desired analysis/display functionality, such as where the user gets the item through security, yet none-the-less desires to ship the item rather than carry it on the aircraft.

Figure 1A:
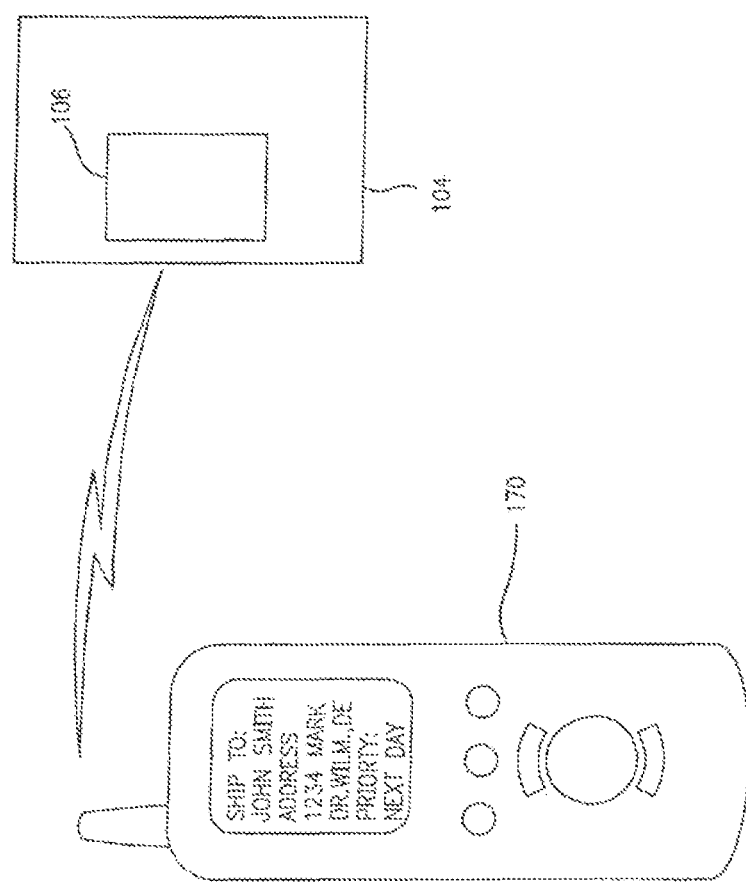
FIG. 1a is an elevational view of an exemplary hand-held interrogator/receiver/display device according to the invention.

As yet another alternative, the reader 108 and analysis/display module 110 may be integrated into a single device 170 (FIG. 1a), such as a handheld device akin to portable GPS receivers now ubiquitous. The user (which may be an employee, or even the shipper) may simply then pick up the unit, interrogate the items to be shipped (thereby encoding the package and retrieving ID data for the database in data communication with the handheld), and then deposit the package in a one-way access receptacle (which may also be interlocked with the handheld via wired or wireless link if desired).

As previously referenced, it will be recognized that the methods of the invention (as exemplified in FIG. 1) are ideally embodied in the form of one or more computer programs. Such program(s) may be rendered in virtually any programming language/environment including for example C, C++, Java, Fortran, Basic, Visual Basic, Unix, Perl, CORBA, or any other medium capable of reasonably implementing such a functionality.

In one exemplary embodiment, the reader module 108 comprises an antenna portion with embedded antenna 105, the latter being either monopole or dipole as desired to interface with the antenna structure of the tag 106 at the selected centerline frequency(ies). The antenna 105 of the module of the exemplary embodiment generates the wakeup or interrogation field needed to elicit a response from the tag 106 when the module is brought in sufficient proximity to the tag or vice-versa. The interrogation field intensity can also be made adjustable by the user, such that each facility can "tune" its module to the desired range/sensitivity. This adjustment can also be accomplished automatically and/or algorithmically (such as under control of the kiosk's central processor previously described herein, or an associated microcontroller).

The reader module 108 is also optionally equipped with a RF transceiver, such as a Bluetooth 2.4 GHz or IEEE-802.11a/b/g device, for communications with other entities, such as a local server or wireless gateway to another network. For example, the SiW1502 Radio Modem IC manufactured by Silicon Wave Corporation of San Diego, Calif., is a low-power consumption device with integrated RF logic and Bluetooth protocol stack adapted for Bluetooth applications. The chip is a fully integrated 2.4 GHz radio transceiver with a GFSK modem contained on a single chip. The SiW1502 chip is offered as a stand alone IC or, may be obtained with the Silicon Wave Odyssey SiW1601 Link Controller IC. The SiW1502 form factor is 7.0×7.0×1.0 mm package which is readily disposed within the interior volume of the kiosk described herein, or even a portable reader or "wand" which may be used by the carrier, such as for providing hand scans of chattels. An RF transceiver and modulator device is adapted to generally comply with the well known "Bluetooth™" wireless interface standard, IEEE-802.11, UWB, or alternatively, so-called "3G" (third generation) communications technologies. The Bluetooth wireless technology allows users to make wireless and instant connections between various communication devices, such as mobile devices (e.g., cellular telephones, PDAs, notebook computers, remote monitoring stations, and the like) and desktop computers or other fixed devices. Since Bluetooth uses radio frequency transmission, transfer of data is in real-time. The Bluetooth topology supports both point-to-point and point-to-multipoint connections. Multiple 'slave' devices can be set to communicate with a 'master' device. The devices are authenticated (optionally) using a RAND-based bonding or pairing process of the type well known in the art (e.g., in Mode 3 link layer security, or Mode 2 "L2CAP" or service-based security). In this fashion, the kiosk/reader of the present invention, when outfitted with a Bluetooth wireless suite, may communicate directly with other Bluetooth compliant mobile or fixed devices including a subject's cellular telephone, PDA, notebook computer, desktop computer, or other kiosks. Alternatively, a number of different RF-enabled "wands" performing chattel scanning may be monitored in real time at a centralized location, such as the kiosk or even a remote location using the kiosk or a local wireless gateway as a proxy node.

Bluetooth-compliant devices, inter alia, operate in the 2.4 GHz ISM band. The ISM band is dedicated to unlicensed users, including airports, thereby advantageously allowing for unrestricted spectral access. The exemplary modulator uses one or more variants of frequency shift keying, such as Gaussian Frequency Shift Keying (GFSK) or Gaussian Minimum Shift keying (GMSK) of the type well known in the art to modulate data onto the carrier(s), although other types of modulation (such as phase modulation or amplitude modulation) may be used.

Spectral access of the device is accomplished via frequency hopping spread spectrum (FHSS), although other approaches such as frequency divided multiple access (FDMA), direct sequence spread spectrum (DSSS, including code division multiple access) using a pseudo-noise spreading code, or even time division multiple access may be used depending on the needs of the user. For example, devices complying with IEEE Std. 802.11a/b/f/g may be substituted for the Bluetooth transceiver/modulator arrangement previously described if desired. Literally any wireless interface capable of accommodating the bandwidth and/or other requirements of the system may be used.

For example, in the case of an airport, the UWB system described below may be considered optimal, due to its low radiated power level, e.g., less than −41.3 dBm/MHz according the FCC unlicensed spectral UWB mask issued circa late 2003. This low power reduces the chance of deleterious interference with, e.g., aircraft communications systems, IFF systems, or other instrumentation or control functions.

In yet another embodiment of the invention, the module 400 utilizes an ultra wide-band (e.g., TM-UWB, OFDM, etc.) protocol for communication with other entities. Specifically, in one embodiment, the module 400 is fitted with a TM-UWB SoC device which utilizes pulse-position modulation (PPM), wherein short duration Gaussian pulses (nanosecond duration) of radio-frequency energy are transmitted at random or pseudo-random intervals and frequencies to convey coded information. Information is coded (modulated) onto the short duration carrier pulses by, inter alia, time-domain shifting of the pulse. For example, a pulse encodes a bit by being temporal shifting of the pulse with respect to a reference, such that a "late" pulse encodes a "0", while an early pulse encodes a "1". This scheme is somewhat akin to the well known frequency shift keying (FSK), wherein two (or more) sideband frequencies are utilized to encode data e.g., 67 kHz down-shift=0; 67 kHz up-shift=1. TM-UWB devices have the advantage of ready penetration of various mediums, as well as ultra-low power consumption and low spectral density, thereby reducing power requirements and potential interference with other device, respectively. In one exemplary variant, the TM-UWB device of the invention comprises a half duplex, 2.0 GHz with variable data rate in excess of 1 Mbps with no forward error correction (FEC). The Gaussian monopulse is of the form:

$$V(t) = (t/\tau) e^{-(t/\tau)^2}$$

Where $\tau$ is a time decay constant related to the Gaussian monopulse duration, and center frequency $f_c = k/\tau$. The monopulse's bandwidth and center frequency are therefore directly related to the monopulse's temporal width or duration. This approach also shifts the transmission time of each monopulse over a significant time interval in accordance with a pseudo-nose (pn) "hopping" code of the type well known in the art, thereby advantageously distributing spectral density to make the spread. This approach is roughly comparable to frequency hopping spread spectrum (FHSS) except in the time domain. Exemplary devices incorporating TM-UWB components including the timer, correlator, and digital baseband signal processor and controller units (not shown) are available from IBM Corporation (SiGe or silicon germanium-based) in the form of a chip set, although it will be recognized that an integrated single device is optimal for the invention. Additional detail on the implementation of TM-UWB systems is found in, e.g., "*Time Modulated Ultra-Wideband for Wireless Applications*"; Time-Domain Corporation, 2000, which is incorporated herein by reference in its entirety.

By using ISM or UWB communications, the RF module can also advantageously communicate with its parent device (e.g., a central node or gateway, another kiosk 110 with transceiver, etc.) without mutual interference with the RF signal of the tags 106, the latter operating at 125 kHz in the nominal embodiment.

Figure 1B:
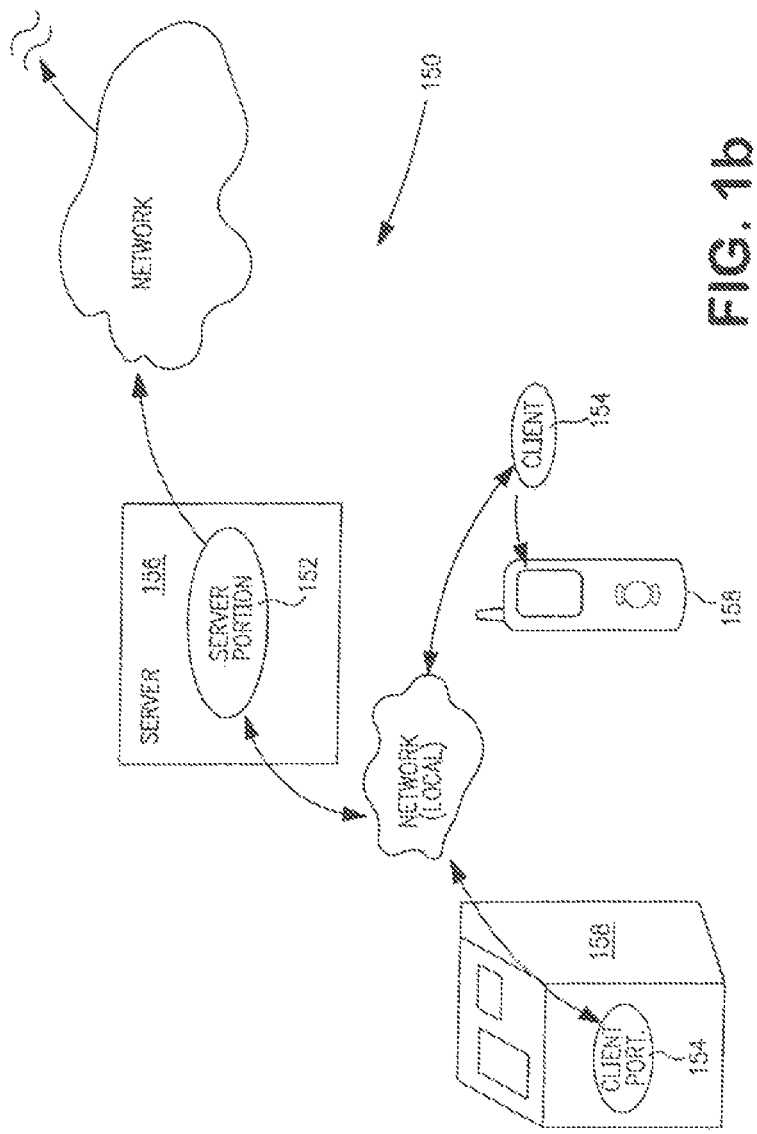
FIG. 1b is a block diagram of one exemplary local network topology useful with the chattel management system FIG. 1.

In another exemplary embodiment of the system, an object-oriented distributed program having client and server portions distributed on respective client and server devices is utilized (FIG. 1b). As used herein, the terms "client device" and "personal electronic device" (PED) include, but are not limited to, personal computers (PCs), whether desktop, laptop, or otherwise, personal digital assistants (PDAs) such as the Apple Newton®, "Palm®" family of devices, handheld computers such as the Hitachi "e-Plate" or Dell Axim, personal communicators such as the Motorola Accompli devices, Motorola EVR-8401, J2ME equipped devices, cellular telephones, set-top boxes, or literally any other device capable of interchanging data with a network. Such devices may interface using wired or optical fiber mechanisms such as an IEEE Std. 802.3 Ethernet interface, Digital Subscriber Line (DSL), V.90 modem, DOCSIS modem, hybrid fiber-coax (HFC) cable, or alternatively via wireless mechanisms and protocols such as IS-95/CDMA-2000, Bluetooth™, IrDA interface, IEEE Std. 802.11(a) or (b), Wireless Application Protocol (WAP)/WTLS, GPRS, GSM, third-generation or "3G" systems (3GPP/UMTS), or any other of myriad data communication systems and protocols well known to those of skill in the communications arts. Creation of such computer programs is readily accomplished by those of ordinary skill in the programming arts, and accordingly is not described further herein.

As shown in FIG. 1b, the distributed software embodiment of the architecture 150 utilizes a server portion 152 and client portion 154 distributed on respective server 156 and client devices 158, ostensibly disposed at different physical locations, and in data communication with each other via a network 160. The client portion 154 of the software can be made "thin" to accommodate the comparatively lower hardware capabilities associated with many client devices 158. This architecture 150 is especially well suited to an object oriented programming environment (e.g., CORBA), as will be recognized by those of ordinary skill. In use, the user manually or automatically establishes communication between the client device and the sever portion, thereby allowing for transfer of data relevant to the impending transaction, such as the user's home address, credit card or payment information, etc. This approach obviates the user having to (i) stand at the kiosk and enter the information manually, and (ii) saves time since the link can be established while the user is performing other tasks, such as walking to the security checkpoint, parking their car, etc. Hence, the user merely need walk to the kiosk, insert their chattel into a shipping element 104, and deposit it on the reader 108. When authenticated and encoded, the receptacle will open to allow the element 104 to gravity feed into the locked receptacle. Alternatively, the encoding can be performed after entry into the receptacle (so as to frustrate surreptitious encoding and removal).

The aforementioned communication channel between the client device and module/server can also be used for two-way (i.e., forward and reverse channel) traffic, such as where transaction information is transmitted back to the client device for storage thereon. Alternatively, such information may be transmitted to a third party or proxy, such as to an e-mail server or URL, wherein the information is directly or indirectly provided to the user (such as via a direct confirmatory e-mail, or as a line item on a monthly statement). The transmitted information may optionally include date/time, user ID, location, routing or tracking number, payment method, and even other information such as the weight of the shipment, results of a security scan (e.g., by an installed e-beam, X-ray, neutron, magnetometer, or chemical "sniffer" device co-located with the kiosk), an image of the tracking label, estimated time/date of delivery, addressee, listing of contents, etc. The transfer of information to the client device may be fully automated, conditional upon assent from the user, or fully manual as desired.

The foregoing architecture may also be used to remotely initiate processes on other devices, such as PEDs, "smart" phones, network agents, or home PCs. For example, in one exemplary variant, the client device software is programmed to initiate an O/S window or Java applet running on a J2ME or equivalent equipped distant (e.g., PED) device upon transmission of a prompt corresponding to a given event. The window or applet includes a user name/password feature, wherein the distant user may instruct their client software to initiate certain algorithms or actions, such as transmission of personal information. In one embodiment, a WAP 2.0 client and proxy are utilized. Alternatively, of course, the distant end user may access the desired target IP address or other network node via the Internet or comparable network directly via the PED, thereby effectuating the desired transaction.

In another embodiment of the invention, a SIP (Session Initiation Protocol) enabled device or comparable is used to establish a secure user session to transmit the required information. In one variant, a "PoC" (push-to-talk {PTT} over cellular) approach is used, wherein the user's mobile device includes an architecture that supports instantaneous communications via, e.g., the aforementioned SIP protocol layered over a UMTS IMS architecture of the type well known in the communications arts. For example, the user's client process can be configured to instigate a PoC session upon the user selecting the chattel proxy or application server as a "buddy" and invoking a PTT transmission. So-called "PTx" or "push-to-anything" technology may be used for this purpose; e.g., pre-formatted packages of data necessary to perform chattel management or related functions can be immediately transmitted to the desired receiver via a one-button transmit functionality. These packets may be encapsulated for security purposes, e.g., via an application layer or other protocol such as Digest, IPSec, MIKEY, etc. Alternatively, where Bluetooth is utilized, the proxy or application server can conduct a (e.g., user-permissive) object pull according to the K-11 or OBEX profiles.

The proxy or application server may also require authentication of the user (or mutual authentication) before any data push or pull is allowed, such as via a RAND challenge-based approach or the like. This helps mitigate "spoofing" or surreptitious denial of service to the user, and substitution of an unauthorized device in place of the true chattel owner, or reception of the user's personal data by an unauthorized device.

In another embodiment, the user's cellular telephone equipped with Assisted GPS (A-GPS) or other such locating system can be used to provide forwarding information. Specifically, in one variant, the user's A-GPS system is prompted to save the coordinates of a particular location where the package must be delivered. For example, a user may want his chattel shipped to a third party where he/she is presently located. The user can merely push a soft function key on their client process, the soft function key either saving the coordinate for a later time/date, or transmitting it to a designated agent (such as the chattel management proxy) described elsewhere herein. That way, the user can merely specify the saved/transmitted location as the destination, without having to remember addresses, zip codes, etc. for the destination. Alternatively, the user can maintain a log or listing of saved GPS coordinates (and or address information) for easy recall at a later date.

In a manner somewhat analogous to the A-GPS, the user can also use their client process to exchange information with other user's devices (such as via a Bluetooth "discovery" process or OBEX object exchange). For example, a user may want their chattel shipped to a friend they are traveling with; the user can then handshake with their friend's device to pull/receive an electronic business card with the required delivery information. Such an approach may be useful where the chattel is rented out or intended for temporary use. Consider, for example, where the user rents a car, drives to the airport, leaves the car, and approaches the security checkpoint. The user can (while at the car rental agency) use either GPS location or "pushed/pulled" data as the basis for a communication to the chattel management system, the data instructing the latter as to where to return the car keys. Myriad other configurations will be recognized by those of ordinary skill provided the present disclosure.

In yet another exemplary embodiment, a user can utilize a more simplified device for communicating with the kiosk or module 110. For example, a coded RFID device (to be distinguished from that in the shipping element 104) may be used to automatically provide the kiosk/module 110 with the user's information, much in the way the prior art Mobil "Speed Pass" provides fueling station pumps with payment information, or the MasterCard Paypass system allows for commercial transactions. As another option, a USB key of the type well known in the art can be simply plugged into an accessible USB port of the module 110, thereby potentially both (i) transferring the user's information, and (ii) saving a user record of the transaction within the user's key. This approach can be coupled with the rapid drop capability described elsewhere herein, such that the kiosk associates a given chattel passed through its aperture or slot with a given user. For example, in one variant, the user simply places the chattel in a holding slot or receptacle, this action which prompts the user via a CRT, LCD, TFT, LEDs, audio prompt, or other UI to scan their RFID device past a sensor. After the kiosk controller/processor module and reader interrogates and retrieves the desired information from the RFID device (and also another entity or database, if desired, such as a pay authorization entity), the user is presented with a visual or other display of the shipping information, at which point the user may confirm or cancel. If confirmed, the kiosk then automatically opens the aperture or slot to receive the user's device. Internal mechanisms within the kiosk then either (i) tag the chattel as belonging to a particular user, such as via attachment of a tag or label, insertion in a "tagged" shipping element 104, diversion to a segregated chute or container, etc. Alternatively, the user can be prompted to affix a bar code, label, tag, or other identifying device, such as may be issued by the kiosk. Hand sorting of the various chattels may then be accomplished by personnel emptying the kiosk receptacle. In another embodiment, computer-readable purchase receipts using multi-dimensional bar codes of the type well known in the art, or other comparable mechanisms, may be used consistent with the invention for encoding the chattels and/or shipping elements 104.

As yet another alternative, the user may simply affix their personal RFID device to the chattel, scan as previously described (such as where the receptacle holding slot/aperture is integrated with or proximate the personal RF ID reader), and authorize, at which point their chattel and their personal RFID device are collectively shipped to the destination. This variant obviates use of the second RFID device within the shipping element, since the user's RFID device contains all of the necessary information, some of which can be encoded onto the device at the time of scan at the kiosk. For example, the user's RFID device can be equipped to have sufficient storage capacity and to receive data from the kiosk reader/interrogator such that this encoding of additional information occurs seamlessly.

As yet another alternative, the kiosk may be fitted with a card reader adapted to receive cards pre-encoded ("pre-paid") with a given monetary value. For example, as is well known, cards bearing magnetic media may be encoded at a remote terminal after the user deposits a given amount of currency. Such cards are currently employed, for example, in libraries where photocopy machines are present, or for telecommunications services. In the present context, the user might deposit a comparatively large amount of currency at the encoding terminal to encode or pre-pay for the deposited amount. Subsequent insertions of the card into the card reader read the encoded data (correlating to a currency balance remaining), subtract the amount of the current transaction, and then recode the card commensurate with the remaining balance. In this fashion, the user may avoid having to carry currency or change each time they wish to use the terminal; rather, they simply swipe or insert/retract the card from the reader/encoder, thereby automatically debiting the card.

As yet another alternative, a user's pre-paid cellular device can be exchanged for services in shipping their chattel. In one exemplary embodiment, the prepaid cellular device is configured to interface with the kiosk (such as via direct physical or wired connection, or wireless link such as RF, inductive, IRdA, or other) such that the service provider for the prepaid device authorizes payment of the chattel shipping via the cell phone/kiosk interface.

As even another alternative, the user who travels frequently can pre-code their devices using apparatus disposed at the POD, their home, or other locations. For example, in one embodiment, the user can attach an RFID devices to their chattels of any significant worth (e.g., cell phone, PDA, car keys, etc.) and encode them with their personal information. Alternatively, these devices may be disposed within the chattels at time of manufacture, and then encoded at or after purchase by the user. Once encoded, these devices can then be immediately scanned when placed in proximity to the reader 108 at the kiosk or other location. This obviates having to carry another currency source or personal RFID device.

In another embodiment, user-specific biometric data can be used alone or in conjunction with other data sources to authenticate or provide the required input to the kiosk. For example, in one variant, the user's fingerprint, retinal scan, facial recognition software scan, or voiceprint are used in a two-of-two, three-of-three, etc. coincidence circuit; i.e., when all inputs can be authenticated and correlated to one individual, the user's data is accessed (such as may be kept in a secure data facility in data communication with the kiosk or its proxy) and used as the basis for payment, shipping destination, etc.

In another embodiment, the system 100 can be coupled to the passenger reservation system operated by the relevant transportation agent (e.g., airline or travel agent), such that upon entry of the user's personal information, the reservation system is accessed to retrieve the user's destination and/or routing information. The option of "route to destination" can then be presented to the user, such as via a touch screen display on the kiosk, thereby allowing one-touch destination selection. Other options may include "home", "office", or any parties designated by the user either manually or via download of information from the personal RFID device or client device (e.g., PDA or cell phone).

The foregoing approaches also have the added benefit (to varying degrees) of reducing overhead costs associated with setting up and managing the trust, since electronic transactions/reporting are often more cost efficient that manual performance (such as by employees interacting with various entities in person or over the telephone or via mail).

It will also be recognized that use of the invention in a POD application may also carry certain economies of scale which can be exploited to the advantage of the carrier or others. For example, where many people traveling on an aircraft utilize the services described herein to forward their chattel to their travel destination, that same aircraft on which they are traveling can be used as the carrier mechanism for these chattels. Hence, if the shipping and security scanning procedures of the chattels can be accomplished rapidly enough, the chattels can optionally be loaded on the very same aircraft (or another traveling to that same destination), and provided to the traveler upon their egress from the aircraft using procedures which are in effect substantially the inverse of those described herein for registering/shipping the chattel.

In yet another embodiment, the shipping service provided to the user can be virtual in nature either in place of or in conjunction with the tangible services previously described. For example, where the user has an electronic device with important information (e.g., laptop, PDA, etc.), yet they are not allowed to take the device or magnetic media on the aircraft or other modality, they can (i) download the relevant information to a proxy agent (e.g., software process) running on the kiosk or its proxy, and direct the proxy agent to forward the information to a designated real or virtual storage location (such as an e-mail account, accessible URL, third party storage facility, etc.), and (ii) utilize the kiosk to physically transfer the device to a designated location. Hence, where the user simply needs a few data files from their PDA, they can download these using, e.g., a Bluetooth, WiFi, or other wireless link and encrypted protocols to the proxy, which then forwards the files via e-mail to an account accessible by the user at the destination. They then contemporaneously ship the device to their home for later retrieval.

It will also be recognized that depending on the configuration of the tag 106, it may be encoded at time of deposit (or before/after, such as via the user's PDA which can transmit data to the kiosk module 110 or a connected device) with various other types of information, including visual or voice data. Hence, the shipping element can carry audible instructions or information when decoded at the destination using an appropriate reader with audio capability. Hence, the package can also be authenticated to some degree by the recipient before opening it. Other types of information, including images, data, etc. can also be encoded into the shipping element.

In another variant, the kiosk may be equipped to generate photographic, IR, X-ray, spectrographic, or even holographic images of the chattel for, e.g., (i) electronic transmission to the user at the destination, such as where merely the appearance or other attribute of the device is important or sufficient; (ii) for a security or "purchase receipt" record of what was actually deposited at the kiosk, e.g., for insurance policy claim use or loss claims against the carrier; or (iii) use by the carrier in sorting a bin of chattels. In the case of option (iii), users may simply swipe their personal RFID device, which after authorization, results in the kiosk generating the image of the chattel, one (tactile or electronic) copy being provided to the user either directly or indirectly, such as via paper copy or e-mail to the user's designated account, and one for use by the carrier in sorting the receptacle. Other data relating to the chattel may also be obtained and encoded/transmitted, such as the item's weight, ferrous content/magnetization, electric field, luminance, fluorescence, or phosphorescence, fast neutron activation (FNA) signature, etc.

Figure 2B:
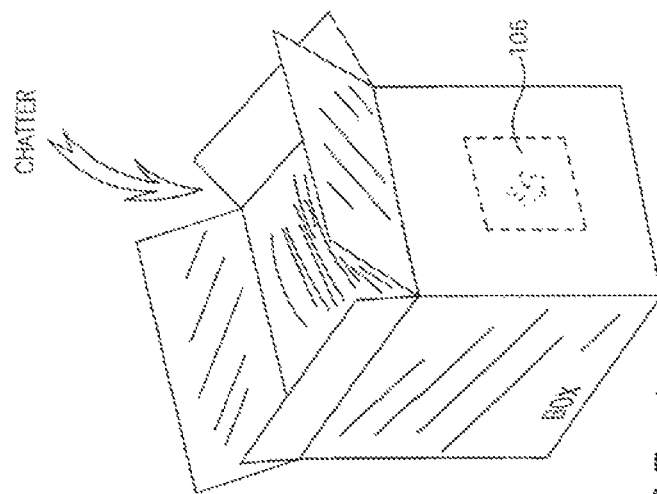
FIGS. 2a-2c are perspective views of envelope, box, and tube embodiments, respectively, of the shipping elements of the invention.
Figure 2A:
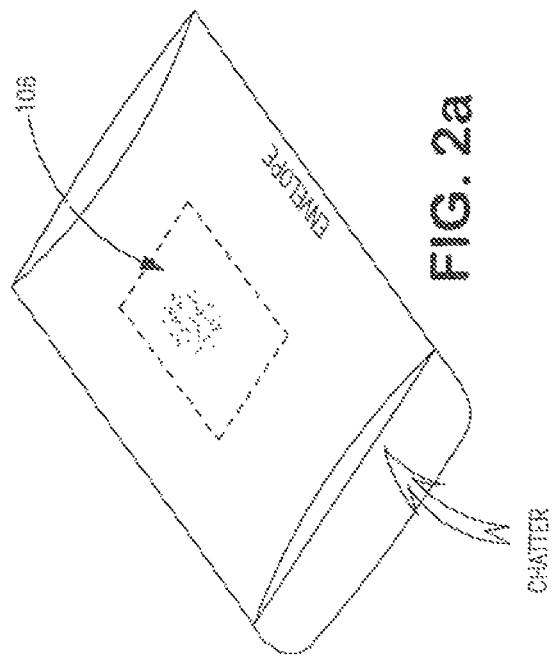
Figure 2C:
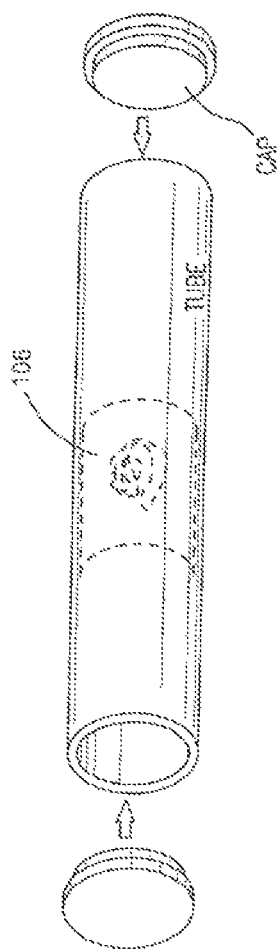

Referring now to FIG. 2a-2c, various embodiments of the "smart" shipping element 104 of the invention are described. In these embodiments, the RFID tag 106 is disposed within a soft, pliable substrate (which may be part of the shipping element 104 itself or otherwise mated thereto, such as using an adhesive). Ideally, the tag 106 is made as discreet as possible, thereby not alerting users to its presence. An envelope (FIG. 2a), box (FIG. 2b), and tube (FIG. 2c) are shown, although other forms may be used. The envelope pouch of FIG. 2a is ideally formed from a flexible material such as a polymer (e.g., polyethylene), Tyvek, or even paper, although other materials such as aramid fibers, elastomers, shrink-wrap or thermally responsive polymers, or flexible composites may be used as well. In yet another embodiment (not shown) the non-metallic conductive inks of the tag 106 are printed directly on the pliable material during manufacture (and the IC mated accordingly). The exemplary "Bistatix" tag 106 is generally substrate-agnostic, and therefore will operate suitably using the materials listed above or others.

It will be apparent from the foregoing discussion that myriad different types of shipping element 104 and tag 106 configurations may be used, the foregoing embodiment being merely exemplary. The receptacle/kiosk may be adapted to accept only certain shapes and/or sizes of element 104, thereby limiting what can be deposited therein.

In yet another embodiment, the kiosk can be configured to automatically package the chattel for the user, the latter merely depositing down a sized slot or aperture. The slot or aperture (in conjunction with other mechanical elements) creates an upper bound on the size of chattel that can be inserted. The user then merely swipes their personal RFID device past the reader, which encodes the tag 106 on the shipping element, seals the element 104, and charges the user's account based on the prevailing cost structure (e.g., weight/destination/priority/special handling). If for whatever reason the item cannot be processed, such as where it is too heavy or the user's payment method is refused, the kiosk merely activates a chute at the bottom of the kiosk to eject the user's chattel into a tray, much akin to a vending machine. Again, the slot or aperture can be actuated only upon conditions precedent if desired, such as authentication of the user's payment source, etc.

In another embodiment, the kiosk includes an LCD display and magnetic card reader of the type well known in the art e.g., similar to those commonly found on gasoline pumps. Such terminal also includes a "soft" keypad having a plurality of fixed or soft (programmable or software controlled) function keys. Such soft keypad may comprise, for example, a capacitive keypad, CRT-based "touch screen", LCD, TFT, or any other similar technology. It will be recognized that mechanical keys or button assemblies may also be used; however, such devices are generally less weather and foreign-matter resistant, and require greater maintenance. The function keys provide a number of different functions to the user, including a "print receipt" function (which may be coupled to a paper or electronic receipt functionality), debit/credit select keys, transaction acknowledgement key, as well as an alpha-numeric keypad for entering data such as passwords, Y/N inputs, etc. Such functions and technology are well known to those of ordinary skill in the electronic arts, and accordingly not described further herein.

Once the commands for the desired transactions have been received by the kiosk, the user is prompted and then selects their payment mode (e.g., debit card) via a fixed function key, and then swipes their card through the card reader. When the magnetic strip (or smart card) is read by the reader, the user's debit information is transferred to the processor of the terminal, wherein the algorithm running thereon next initiates a request for the user's password or "PIN" code via the display device (or alternatively via an audio interface driven by e.g., stored CELP voice data file, not shown). After the user enters the PIN code or password via the keypad, the authorization is obtained from the user's CCA or financial institution using any number of existing commercial financial transaction secure links well known in the industry. Once authorized, the controller of the controller issues a command to enable the reader 108 and, optionally unlock the locking device to allow insertion of the shipping element 104.

In yet another embodiment, the chattels of two or more users can be aggregated into a common shipment or shipping element 104 in order to reduce costs. For example, where a number of passengers in a security checkpoint are traveling to the same destination, and a plurality of them have chattels which cannot be taken on board, the users can pair up in groups of two or more and utilize a common shipping element. To this end, the POD facility, air carrier, etc. can also provide or facilitate such a service, such as where the air carrier provides a kiosk whereby all user's with rejected chattels can deposit their chattels for shipment to the destination via the passenger's aircraft or another aircraft/mode. This service may be provided either gratuitously or for a fee.

In another embodiment, the user, carrier or service provider can provide "stick-on" or otherwise selectively attachable RFID, bar code, magnetic strips, or even printed tags which the user can apply to their chattels for tracking. For example, in one case, the user can apply a number of pre-coded bar code labels to each of their chattels before travel (or even at the POD once they know that the chattel cannot be transported via the selected modality). The user then simply scans the label with a bar code reader provided a the kiosk (akin to a prior art supermarket checkout kiosk), and deposits the chattel in the receptacle (whether in a shipping element 104 or not) for subsequent handling by the carrier.

To this end, users can establish pre-existing accounts, much like a prior art Fedex or UPS account, whereby the payment, shipment, etc. information is already known by the carrier. Multiple different options can also be selected by the user such as, e.g., at time of scanning, wherein the CRT or other kiosk display device prompts the user to select a shipping destination, etc. The carrier can also utilize the aforementioned economies regarding co-location to make the service more cost efficient. For example, a kiosk at San Diego Airport is likely to receive a large number of chattels from people in the greater San Diego area requesting that the chattels be returned to their home address, thereby allowing for grouping of deliveries for greater economy.

Furthermore, "intelligent" kiosk management can be utilized, whether in operation and/or construction, so as to increase economies. For example, the kiosk or subsequent handling mechanisms can be configured to selectively sort the deposited shipping elements or chattels based on destination. Furthermore, the controller module of the kiosk can be programmed to alert a parent or proxy node of the need for unloading of the receptacle under certain conditions, such as when a sufficient number of items for a given destination are received. In order to reduce cost to the user, the latter may also be given the option to trade cost for latency; i.e., if a user can wait longer to get their chattel back, their cost of shipment can be lowered. This dynamic is particularly relevant to the present invention, since many travelers won't arrive back home for several days anyway, thereby increasing their tolerance to longer shipping delays.

This metric can also be managed by the kiosk or carrier, such as where kiosks are preferentially distributed (or alternatively are equipped with receptacles equating to different shipping priorities or delays) such that their users are skewed towards the relevant portion of the population. For example, a "long delay" shipment kiosk may be placed at the international terminal, a shorter latency kiosk may be suited better to the domestic or commuter flight terminals.

Also, the carrier or provider of the kiosk can coordinate with other carriers (such as Fedex or UPS) so as to intelligently schedule and manage distribution of the chattels to their destinations. For example, with data coupling of the kiosk carrier system with that of other carriers, and coordination there between, duplication of routes can be minimized, such as through a cross-carrier distribution agreement.

Figure 3:
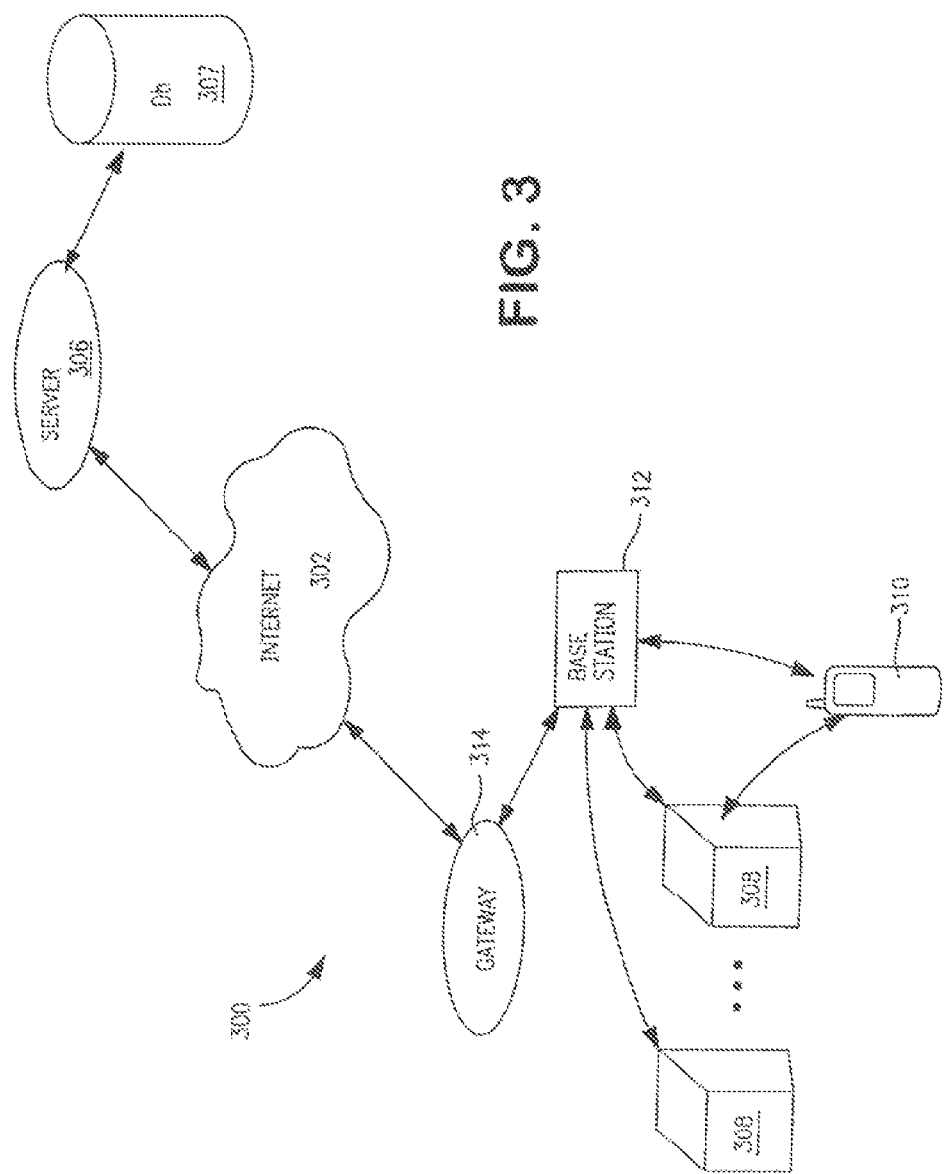
FIG. 3 is a block diagram of another exemplary embodiment of the chattel management system of the invention, adapted for wireless local interface and Internet access of a remote server and database.

As shown in FIG. 3, the Internet or other internet/intranet is used as the basis for one embodiment of the "backbone" of the system 300. The system 300 includes, for example, a backend server 306, a plurality of "front end" kiosk devices 308, including one or more mobile WAP-enabled wireless devices 310, the kiosks interfaced through a wireless base station 312 and WAP gateway 314 of the type well known in the art, the latter being in data communication with the Internet 302. The WAP associated WTLS security protocols may also be employed if desired. Clearly, the use of WAP and a wireless topology in this embodiment is merely illustrative.

The Internet 302 advantageously makes use of the well known and generally ubiquitous TCP/IP protocol, thereby assuring compatibility and access by a wide variety of existing client devices. The server 306 is coupled to a database 307 which provides, inter alia, storage of user-related data and information such as personal information, statistics, security information, credit card information, etc. It will be recognized that multiple database entities may be used, such multiple entities being either co-located or disparate. The database 307 may also be functionally (as opposed to physically) partitioned and firewalled, such that various types of data are restricted from access by certain entities. Additionally, the POD kiosks 308 may coupled directly to the Internet, LAN, WAN, MAN, intranet, etc. via a service provider 332 (dedicated or otherwise).

The kiosks 308 may include for example audio-visual apparatus such as an H.323-compliant protocol suite adapted for transfer of audio-visual data between the user and a customer service agent 336, whereby the user and agent can communicate audibly (such as via VoIP software installed on the Kiosk and agent terminal) and visually to complete the transaction. Alternatively, the kiosk 308 can be configured with speech recognition software of the type now well known in the art to convert audible speech by the user to text or other data which is then utilized by the distant end to accomplish any number of functions such as chattel deposit and routing, providing on-demand information, etc. A text-to-speech (TTS) capability may also be employed, wherein pre-stored or dynamically generated data files may be converted to audible speech at the kiosk. Alternatively, pre-stored CELP or similar compressed speech data files may be decompressed and played at the Kiosk to provide audio information.

A capacitive or other type of touch screen is optionally provided as an input device, with the display of the kiosk 308 (not shown) acting as both a display device and an input device, thereby simplifying the user interface.

In another embodiment, a peer-to-peer arrangement (either aided by a network agent or server, or true P2P) may be used as the model for communications between entities, whether customer-to-carrier, customer-to-customer, carrier-to-carrier, etc.). It is even envisioned that a user-based bidding or barter system may be established, such as where users may place bids on unclaimed chattels (somewhat akin to the prior art "eBay" paradigm), or barter between themselves via P2P to exchange chattels. For example, a user unable to carry a given chattel on an aircraft may invoke a P2P session over their WiFi link, and solicit a bid for the chattel form another party on say, an incoming aircraft or waiting to pick up a passenger in the terminal. The selling user can then deposit the chattel in a nearby kiosk as described elsewhere herein, and the purchaser can be electronically enabled to access the chattel after payment is made. Hence, the kiosk can act as an electronic transaction arbiter and temporary storage location, for a fee to be extracted from the seller or buyer (or both). The particular kiosk where the chattel is deposited can also be readily identified to the purchaser via their PED or other means, such as a page to their cell phone, etc. A user can also reroute their chattel to another location after deposit. These transactions can also be conducted via cell phone if desired, again with the kiosk or system 100 acting as the intermediary for the transaction.

It will be recognized that myriad different audio, display, and input technologies may be utilized consistent with the invention to transfer information between the user and the "agent" of the carrier.

Furthermore, the term "kiosk" is not limited to any particular physical layout, location, or arrangement. For example, a kiosk may be fixed or mobile, stand-alone or as part of another structure or component, indoor or outdoor, etc.

Also, the kiosks or their components also need not be in one physical location; rather a "virtual" kiosk scattered at various locations throughout the POD for example is envisaged, acting electronically as one kiosk. In this fashion, data received and actions taken by various different physical kiosks can be coordinated and/or analyzed as desired.

Furthermore, the kiosks of the present invention(s) need not be fixed, but may also be mobile, such as where they are mounted on vehicles which are roving in nature. In one variant, an airport cart is configured with a mobile kiosk with secure WiFi or UWB link; the driver drives the cart to different security locations periodically to pick up chattels from users (or merely allow them to interact with the kiosk as previously described herein), or even for incidental user contact, much the way one waves down a taxicab.

As yet another option, the interface between the shipping agent or its proxy and the user may be implemented using a virtual private network (VPN) of the type well known in the art, which provided secure end-to-end communications between two or more points via an untrusted network such as the Internet. This embodiment may be implemented via the aforementioned WAP/WTLS technology suite and associated protocol stacks, through a dedicated or shared RADIUS server and tunneled packets, or any other comparable arrangement capable of restricting access to the transmissions, database or other repositories of information to only authorized personnel. Use of such security technology may be an important criteria in certain contexts, since users may want to have their personal data (i.e., identity, place of residence, credit card information, etc.) maintained in strict confidence to avoid any fear of surreptitious theft and use of this information without authorization (e.g., "identity theft"), or attempts to interfere with the delivery of the shipping element at or near its destination.

The Internet may also advantageously be used as a medium for receipt of shipment requests or solicitation of new prospective participants, in that a URL (e.g., designating a worldwide website) may be used to provide information, receive data, requests for additional information, etc. Furthermore, meta-tags embedded in the site will key Internet search engines to locate the site upon the initiation of an appropriate search using an Internet search engine (such as Yahoo!, Google™, etc.). In one embodiment, an applet or comparable browser mechanism is initiated upon such search, the applet being configured to alert the user to the existence of the URL/website when a search having appropriate parameters is initiated.

It will be appreciated that the chattel transport services described herein may also be provided in conjunction with other services, whether related or not. For example, chattels may be stored (either at the POD or another location) for a finite period of time at the user's request, somewhat like an airport or bus terminal locker. In one variant, the transport destination may be designated as OPOD (original POD), such that the user can merely pay for the storage of his/her chattel, and then recover it at a later time, such as upon the completion of their return flight. Others may also be authorized to access the storage facility/receptacle, such as family members, etc.

Other services may comprise, e.g., cleaning, repair, maintenance, testing, etc. of the chattel, registration in a database, etc. The user may also be presented with POS (point of sale) options at the POD for these or other goods/services, such as flight insurance, chattel shipment insurance, MP3 or music downloads, or even carrier-authorized replacement chattels for those being surrendered by the user.

It is also noted that the various tracking or marking mechanisms described herein (i.e., RFID, bar codes, magnetic strips, etc.) are not exclusive of one another, and in fact may be used together to advantage, such as to perform different functions at different points throughout the processing or transit chain of the chattels. For example, the RFID tagging approach may be more suitable to one portion of the chain (such as user interface at the kiosk), whereas magnetic media may be more desirable for other processing tasks. These different media may also be made selectively removable if desired, so that a chattel or shipping element 104 can be "marked" and "unmarked" if desired during processing, delivery, security scanning, etc. Encodings used on the shipping elements can also be made human readable if desired to facilitate such processing.

It should be recognized that while the foregoing discussion of the various aspects of the invention has described specific sequences of steps necessary to perform the methods of the present invention, other sequences of steps may be used depending on the particular application. Specifically, additional steps may be added, and other steps deleted as being optional. Furthermore, the order of performance of certain steps may be permuted, and/or performed in parallel with other steps. Hence, the specific methods disclosed herein are merely exemplary of the broader methods of the invention.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The described embodiments are to be considered in all respects only illustrative and not restrictive. The scope of the invention is, therefore, indicated by the appended claims rather than the foregoing description. All changes that come within the meaning and range of equivalence of the claims are to embraced within their scope.

What is claimed is:

1. A mobile apparatus, comprising:
   a processor;
   memory in data communication with said processor;
   a display device;
   a user interface configured to receive a selection of a desired service from a user;
   a global positioning system (GPS) receiver configured to generate information related to a current location of said mobile apparatus; and
   a software process operative to run on said processor, said process comprising a plurality of instructions which are configured to, when executed, encode and transmit a message, said message being based at least on said selection and said information related to said current location;
   wherein said message causes a provision by a third party of said desired service for said user at said current location.

2. The apparatus of claim 1, wherein said mobile apparatus comprises a handheld electronic device, said device having a radio frequency interface over which said message is transmitted.

3. The apparatus of claim 2, wherein said radio frequency interface comprises a cellular telephony and data interface.

4. The apparatus of claim 2, wherein said radio frequency interface comprises a Wi-Fi (IEEE Std. 802.11) compliant interface.

5. The apparatus of claim 1, wherein said mobile apparatus comprises a cellular-enabled smart-phone, and said desired service comprises movement of a transportation modality to said current location.

6. The apparatus of claim 5, wherein the smart-phone is further configured to conduct a purchase transaction enabled by a financial institution.

7. The apparatus of claim 6, wherein said user interface comprises a touch screen interface configured to display at least one soft function key, said at least one soft function key enabling said transmission of said message to said third party without further user intervention.

8. The apparatus of claim 1, wherein said apparatus is further configured to encode and transmit user-specific data comprising information that uniquely identifies said user.

9. The apparatus of claim 8, wherein said user-specific data further comprises user financial account information.

10. The apparatus of claim 1, wherein said desired service comprises movement of a transportation modality to said current location.

11. The apparatus of claim 10, wherein said movement of a transportation modality to said current location comprises movement by the transportation modality to deliver an item carried on the transportation modality which the user wishes to obtain.

12. A mobile apparatus, comprising:
    a processor;
    a display device;
    a wireless interface in data communication with the processor;
    memory in data communication with said processor;
    a global positioning system (GPS) apparatus configured to generate information related to at least one location of said mobile apparatus;
    a user interface configured to receive an input from a user causing the apparatus to store the generated information related to the at least one location; and
    a software process operative to run on said processor, said process comprising a plurality of instructions which are configured to, when executed, encode and transmit a message via the wireless interface, said message being based at least in part on said stored information;
    wherein said message causes provision of a service by a third party at or proximate to the at least one location.

13. The apparatus of claim 12, wherein said user interface configured to receive an input from a user causing the apparatus to store the generated information related to at least one location comprises a user interface configured to receive multiple inputs from the user, and store respective ones of multiple locations for later use by the user, the user interface configured to display information on the display device allowing the user to select at least one of the stored multiple locations.

14. The apparatus of claim 13, wherein said user interface comprises a touch screen interface configured to display at least one soft function key, said at least one soft function key enabling said transmission of said message to said third party without further user intervention.

15. The apparatus of claim 12, wherein said message is transmitted to said third party, and said apparatus is further configured to encode and transmit user-specific data comprising information that uniquely identifies said user to said third party.

16. The apparatus of claim 15, wherein said transmitted user-specific data further comprises information that enables payment by the user for the provided service from a credit or debit account of the user.

17. A mobile user apparatus, comprising:
a data processing apparatus;
a display device;
a wireless interface in data communication with the data processing apparatus;
storage apparatus in data communication with said processing apparatus;
a global positioning system (GPS) apparatus; and
a software process operative to run on said processor, said process comprising a plurality of instructions which are configured to, when executed:
receive a message from a computerized device via the wireless interface, the message comprising location information relevant to a user of the computerized device;
store at least a portion of the location information; and
encode and transmit a second message, said second message being based at least in part on said stored information and causing provision of a service by a third party at or proximate to the location specified by the location information.

18. The apparatus of claim 17, wherein said location information relevant to a user of the computerized device comprises a fixed address associated with the user of the computerized device.

19. The apparatus of claim 17, wherein said service comprises delivery by said third party of one or more items.

20. The apparatus of claim 17, wherein:
said display device comprises a touch screen interface, and said apparatus is configured to display at least one soft function key on the display device, said at least one soft function key enabling said transmission of said second message to said third party without further user intervention; and
said apparatus is further configured to encode and transmit user-specific data comprising information that uniquely identifies said user to said third party, said transmitted user-specific data further comprises information that enables payment by the user for the provided service from a credit or debit account of the user.

21. The apparatus of claim 20, wherein the mobile user apparatus is configured to employ both (i) physical layer security and (ii) protocol level security, for at least the second message.

22. The apparatus of claim 21, wherein the physical layer security comprises security provided for an air interface of the wireless interface, and the protocol level security comprises use of a secure sockets layer (SSL) protocol.

23. Non-transitory computer readable storage apparatus configured for use in a mobile electronic apparatus, the mobile electronic apparatus comprising:
a processor;
a display device in data communication with the processor;
a first radio frequency interface in data communication with the processor;
a user interface configured to receive a selection of a desired service from a user and generate at least one signal relating thereto; and
an assisted global positioning system (A-GPS) receiver in data communication with the processor and configured to generate data related to a current location of said mobile electronic apparatus;
wherein the non-transitory computer readable storage apparatus is in data communication with said processor and comprises at least one computer program stored therein, the at least one computer program operative to run on said processor, said at least one computer program comprising a plurality of instructions which are configured to, when executed:
encode and enable transmission of a message, said message being based at least on said at least one signal related to said selection of said desired service and said data related to said current location of said mobile electronic apparatus;
wherein said message is configured to cause provision by a third party of said desired service for said user at said current location.

24. The non-transitory computer-readable storage apparatus of claim 23, wherein said mobile electronic device is configured to perform said transmission via the first radio frequency interface substantially automatically upon receipt of said at least one signal.

25. The non-transitory computer-readable storage apparatus of claim 24, wherein said first radio frequency interface comprises a wireless interface utilizing an OFDM (orthogonal frequency division multiplexed) protocol, the wireless interface utilizing said OFDM protocol to mitigate interference with other radio frequency communications devices.

26. The non-transitory computer-readable storage apparatus of claim 25, wherein said first radio frequency interface comprises a Wi-Fi (IEEE Std. 802.11) compliant interface.

27. The non-transitory computer-readable storage apparatus of claim 23, wherein said mobile electronic apparatus comprises a cellular-enabled smart-phone, and said desired service comprises movement of a transportation modality to said current location by said third party.

28. The non-transitory computer-readable storage apparatus of claim 27, wherein the smart-phone is further configured to conduct an electronic purchase transaction enabled by a financial institution, the purchase transaction conducted based at least in part on data stored in a secure data storage element of the smart-phone.

29. The non-transitory computer-readable storage apparatus of claim 28, wherein said user interface comprises a capacitive touch screen interface configured to display at least one soft function key, said at least one soft function key configured to, when selected, cause said transmission of said message to an electronic proxy agent of said third party without further user intervention.

30. The non-transitory computer-readable storage apparatus of claim 23, wherein said at least one computer program is further configured to encode user-specific data comprising information that uniquely identifies said user to the third party or a proxy thereof.

31. The non-transitory computer-readable storage apparatus of claim 30, wherein said user-specific data further comprises user financial account information.

32. The non-transitory computer-readable storage apparatus of claim 30, wherein said desired service comprises movement of a transportation modality to said current location in order to deliver one or more chattel for the user.

33. The non-transitory computer-readable storage apparatus of claim 32, wherein said chattel is selected from the group consisting of: (i) a liquefied substance in a container; (ii) one or more tools; and (iii) one or more car key apparatus.

34. The non-transitory computer-readable storage apparatus of claim 33, wherein the transportation modality comprises a shipping agent or service with whom the third party has previously shipped the one or more chattel.

35. The non-transitory computer-readable storage apparatus of claim 23, wherein said at least one computer program comprises a client portion of a distributed application, the distributed application having a plurality of client portions and at least one server portion, the at least one server portion configured to communicate with each of the plurality of client portions via the Internet and a universal resource locator (URL) supplied by the third party.

36. The non-transitory computer-readable storage apparatus of claim 23, wherein the at least one computer program comprises at least one transportation-related application computer program configured to run thereon, the at least one transportation-related application computer program having been downloaded to the non-transitory computer-readable apparatus of the mobile electronic apparatus after manufacture of the mobile electronic apparatus, the at least one transportation-related application computer program having been rendered in a Java-based programming language.

37. The non-transitory computer-readable storage apparatus of claim 36, wherein the mobile electronic apparatus is further configured to conduct a purchase transaction enabled by a financial institution for the desired service.

38. The non-transitory computer-readable storage apparatus of claim 37, wherein the at least one computer program further comprises at least one commerce-related application computer program configured to run thereon, the at least one commerce-related application computer program having been rendered in a Java-based programming language and having been downloaded to the non-transitory computer-readable apparatus of the mobile electronic apparatus after manufacture of the mobile electronic apparatus, the at least one commerce-related application computer program configured to enable conduct of the purchase transaction.

39. The non-transitory computer-readable storage apparatus of claim 36, wherein said user interface comprises a capacitive touch screen interface configured to display at least one soft function key, said at least one soft function key causing, when activated by said user, said transmission of said message without further user intervention, said transmission comprising transmission to a universal resource locator (URL) supplied by the transportation-related application computer program, said URL associated with or controlled by a second party acting as a proxy or agent for the third party, the third party actually performing the desired service.

40. The non-transitory computer-readable storage apparatus of claim 23, wherein said first radio frequency interface comprises an OFDM (orthogonal frequency division multiplexed)-based data interface, and the mobile electronic apparatus further comprises a Wi-Fi (IEEE Std. 802.11) compliant OFDM interface; and
  wherein the at least one program is configured to enable transmission of the message over either the first radio frequency interface or the Wi-Fi compliant interface.

41. The non-transitory computer-readable storage apparatus of claim 23, wherein said mobile electronic device comprises a smartphone capable of utilizing Java-based application programs, and further comprises a short-range radio frequency interface in data communication with the at least one computer program, the short-range interface disposed within the mobile electronic device at the time of manufacture of the mobile electronic device, the at least one computer program configured to cause the short-range interface to exchange data with an external radio frequency device, the exchanged data enabling purchase by the user of the desired service from the third party or its proxy.

42. The non-transitory computer-readable storage apparatus of claim 41, wherein said at least one computer program further comprises at least one electronic-commerce-related application computer program rendered in a Java-based programming language, the at least one electronic-commerce-related application computer program having been downloaded to the non-transitory computer-readable apparatus of the mobile electronic apparatus after manufacture of the mobile electronic apparatus and configured to enable conduct of the purchase by the user via the user interface.

43. The non-transitory computer-readable storage apparatus of claim 23, wherein said at least one computer program is further configured to encode said message such that said desired service is simultaneously provided to two or more users, said simultaneous provision of the desired to two or more users comprises use of the same transportation modality for provision of the service.

44. The non-transitory computer-readable storage apparatus of claim 43, wherein said use of the same transportation modality for provision of the service provides an economic benefit to at least one of: (i) the third party, or, (ii) one or more others.

45. The non-transitory computer-readable storage apparatus of claim 23, wherein said at least one computer program is configured to receive an electronic message comprising information relating to the performance of the desired service, the electronic message comprising the information generated by a remote server acting as a proxy for the third party.

46. The non-transitory computer-readable storage apparatus of claim 45, wherein said information relating to the performance of the desired service comprises: (i) a date and time the service was performed, (ii) information indicating the current location; and (iii) information indicating a payment method.

47. The non-transitory computer-readable storage apparatus of claim 46, wherein said information relating to the performance of the desired service further comprises a destination location.

48. The non-transitory computer-readable storage apparatus of claim 23, wherein said at least one computer program is configured to receive an electronic message comprising information relating to the performance of the desired service, said information relating to the performance of the desired service comprises an estimating future time of completion of the desired service.

49. The non-transitory computer-readable storage apparatus of claim 23, wherein:
  said transmission of said message comprises transmission via at least the first radio frequency interface and an Internet to a remote server; and
  said at least one computer program is further configured to cause instantiation of at least one user interface element on a display device of a personal electronic device of another user also in wireless communication with the network server.

50. The non-transitory computer-readable storage apparatus of claim 49, wherein said at least one computer program comprises a transportation service-related application computer program rendered in an object-oriented programming language, and said personal electronic device of said another user comprises a transportation service-related application computer program, and the at least one user interface element comprises a window or other display element by which the another user can initiate or authorize at least a portion of the desired service.

51. Non-transitory computer readable storage apparatus configured for use in a mobile electronic apparatus, the mobile electronic apparatus comprising:
digital processor apparatus;
a capacitive touch screen input and display device in data communication with the digital processor apparatus;
a first radio frequency interface in data communication with the digital processor apparatus, the first radio interface comprising a cellular interface;
a second radio frequency interface in data communication with the digital processor apparatus, the second radio interface comprising an interface compliant with an IEEE 802.11 Standard; and
a global positioning system (GPS) wireless receiver in data communication with the digital processor apparatus and configured to generate data related to a current location of said mobile electronic apparatus;
wherein the non-transitory computer readable storage apparatus is in data communication with said digital processor apparatus and comprises at least one computer program stored therein, the at least one computer program operative to run on said digital processor apparatus, said at least one computer program comprising a plurality of instructions which are configured to, when executed on the digital processor apparatus:
generate a user interface element via the capacitive touch screen input and display device, the user interface element configured to receive, via the capacitive touch screen input and display device, a selection of a desired service from a user of the mobile electronic device, and generate at least one signal relating to said selection;
based at least on the at least one signal, substantially automatically encode a first message to an internetwork server, said message configured to cause provision by a third party of said desired service for said user at said current location, said message being based at least on said data related to said current location of said mobile electronic apparatus and being uniquely associated with a user account of the user, the user account maintained on the server; and
cause wireless transmission of the first message to the server at least via at least one of the first radio frequency interface or the second radio interface;
wherein the at least one computer program enables the user to cause provision of the desired service at the current location without the user having to know or remember a specific address thereof or name associated therewith.

52. The non-transitory computer readable storage apparatus of claim 51, wherein:
the first radio frequency interface comprises a wireless interface utilizing an OFDM (orthogonal frequency division multiplexed) protocol;
the mobile electronic apparatus comprises a smartphone, and further comprises a Bluetooth-compliant wireless interface in data communication with the data processor apparatus, and wherein the at least one computer program is further configured to exchange data with another mobile electronic device via the Bluetooth-compliant wireless interface, the exchanged data relating at least in part to the desired service.

53. The non-transitory computer readable storage apparatus of claim 52, wherein the mobile electronic apparatus further comprises a short-range wireless interface compliant with at least one radio frequency identification (RFID) standard, the short-range wireless interface in data communication with the data processor apparatus, and wherein the at least one computer program is further configured to communicate financial account-related data with an electronic device via at least the short-range wireless interface, the account-related data being used to pay at least in part for at least one of a good or service.

54. The non-transitory computer readable storage apparatus of claim 51, wherein the mobile electronic apparatus further comprises a short-range wireless interface compliant with at least one radio frequency identification (RFID) standard, the short-range wireless interface in data communication with the data processor apparatus, and wherein the at least one computer program is further configured to communicate financial account-related data with an electronic device via at least the short-range wireless interface, the account-related data being used to pay at least in part for the desired service.

55. The non-transitory computer readable storage apparatus of claim 51, wherein the at least one computer program is further configured to utilize a secure sockets layer (SSL) protocol for at least transmission of the message to the server.

56. The non-transitory computer-readable storage apparatus of claim 51, wherein said at least one computer program is further configured to encode said message such that said desired service is simultaneously provided to two or more users, said simultaneous provision of the desired to two or more users comprises use of the same transportation modality for provision of the service so as to provides an economic benefit to at least one of: (i) the third party, or (ii) one or more others.

57. The non-transitory computer-readable storage apparatus of claim 51, wherein said at least one computer program is further configured to receive an electronic message comprising a plurality of information relating to the performance of the desired service, the plurality of information relating to the performance of the desired service comprising information indicating: (i) a date and time the service was performed, (ii) at least one of the current location or a destination location; and (iii) a payment method.

58. The non-transitory computer-readable storage apparatus of claim 57, wherein said at least one computer program is further configured to receive an electronic message comprising an estimated time of completion of the desired service.

59. Non-transitory computer readable storage apparatus configured for use in a mobile electronic apparatus for provision of one or more services based on location, the mobile electronic apparatus comprising:
a digital processor;
a display device in data communication with the digital processor;
a first radio frequency interface in data communication with the digital processor;
a user interface configured to receive a selection of a desired service from a user; and
an assisted global positioning system (A-GPS) receiver in data communication with the digital processor and configured to generate at least information related to a current location of said mobile electronic apparatus;

wherein the non-transitory computer readable storage apparatus is in data communication with said digital processor and comprises at least one computer program stored therein, the at least one computer program operative to run on said digital processor, said at least one computer program comprising a plurality of instructions which are configured to, when executed:
- receive a user input relating to a second location where the user desires to obtain the desired service, the second location different from the current location;
- encode a message, said message being based at least on said second location and said selection of a desired service; and
- cause transmission of said message to a network server via at least the first radio frequency interface, the network server maintaining an account associated with the user; and
- wherein said message is configured to cause notification of a third party that said desired service is to be performed for at least said user at said second location; and
- wherein said at least one computer program is further configured to cause storage of data relating to said performance by said third party of the desired service on the network server in association with the account of the user.

60. The non-transitory computer readable storage apparatus of claim 59, wherein at least the encoding of the message is based on a plurality of geographic coordinates associated with the second location, the plurality of geographic coordinates determined by the at least one computer program based at least on data generated by the A-GPS receiver.

61. The non-transitory computer readable storage apparatus of claim 60, wherein:
- the display device comprises a capacitive touch screen input and display device in data communication with the digital processor;
- the user interface comprises computerized logic configured to generate a user interface element via the capacitive touch screen input and display device, the user interface element configured to receive, via the capacitive touch screen input and display device, the user input relating to the second location.

62. The non-transitory computer-readable storage apparatus of claim 61, wherein said at least one computer program is further configured to receive an electronic message comprising a plurality of information relating to the performance of the desired service, the plurality of information relating to the performance of the desired service comprising: (i) a date and time the service was performed, (ii) at least one of the current location or a destination location; and (iii) a payment method.

63. The non-transitory computer-readable storage apparatus of claim 62, wherein said at least one computer program is further configured to receive an electronic message comprising an estimated time of provision of the desired service.

64. The non-transitory computer-readable storage apparatus of claim 62, wherein said at least one computer program is further configured to cause instantiation of at least one user interface element on a display device of a personal electronic device of another user also in wireless communication with the network server.

65. The non-transitory computer-readable storage apparatus of claim 64, wherein said at least one computer program comprises a transportation service-related application computer program, and said personal electronic device of said another user comprises a transportation service-related application computer program, and the at least one user interface element comprises a window or other display element by which the another user can initiate or authorize at least a portion of the desired service.

66. A method of providing a transport-related service for a user of a mobile electronic device, the mobile electronic device having a digital processor apparatus, a wireless interface in data communication with the digital processor apparatus, a storage device in data communication with the digital processor apparatus, the storage device having at least one transport service-related application computer program disposed thereon, the at least one transport service-related application configured to be executed on at least the digital processor apparatus, an assisted global positioning system (A-GPS) receiver capable of generating location data, an input device in data communication with the digital processor apparatus, and a display device in data communication with the digital processor apparatus, the method comprising:
- receiving from the mobile electronic device and at a network server, one or more electronic messages, the one or more messages collectively comprising at least: (i) information relating to a then-current location of the mobile electronic device; (ii) data uniquely indicative of the user or an account associated therewith; and (iii) a desired transport-related service to be provided at the then-current location, the one or more messages having been generated at least in part by the transport service-related application computer program;
- based at least on the one or more messages, facilitate provision of the desired transport-related service at the then-current location by a third party transportation service.

67. The method of claim 66, wherein the desired transport-related service comprises movement of a transportation modality to the then-current location.

68. The method of claim 67, wherein the desired transport-related service further comprises either pickup or drop-off of an item by the transportation modality at the then-current location, the item comprising at least one of an automobile key or a tool.

69. The method of claim 67, wherein the information relating to the then-current location comprises data relating to geographic coordinates, the coordinates obtained based at least in part on location data provided by the A-GPS receiver.

70. The method of claim 66, wherein the information relating to the then-current location comprises geographic coordinates, the coordinates obtained based at least in part on location data provided by the A-GPS receiver.

71. The method of claim 70, further comprising providing the transport service-related application computer program for download to the mobile electronic device and storage on the storage device, the transport service-related application computer program having been rendered in a Java-based computer programming language and being configured to enable establishment of a secure sockets layer (SSL) session with a remote network server, the transport service-related application program comprising logic configured to enable the user to pay for the desired service using the mobile electronic device and previously supplied credit card data of the user, the previously supplied credit card data retained in a secure data repository.

72. The method of claim 71, further comprising:
- subsequent to said causing provision, generating an electronic mail or message to the user, the generated mail or message comprising at least: (i) a date and time the transportation-related service was performed, (ii) at least one of the then-current location or another location; and (iii) a payment method; and causing transmission of the generated electronic mail or message to the user.

73. The method of claim 66, further comprising:
accessing, based at least one the data uniquely indicative of the user or an account associated therewith, financial payment source data of the user; and
utilizing the financial payment source data to cause payment for the desired transport-related service.

74. The method of claim 73, further comprising:
subsequent to said facilitating provision, generating an electronic mail or message to the user, the generated mail or message comprising at least information indicative of: (i) a date and time the transport-related service was performed, (ii) at least one of the then-current location or another location; and (iii) a financial payment source associated with the financial payment source data; and
causing transmission of the generated electronic mail or message to the user.

75. The method of claim 73, wherein the accessing the financial payment source data of the user comprises accessing a secure repository of credit card data, the repository in data communication with the network server, the secure repository comprising at least credit card data previously supplied by the user.

76. The method of claim 73, wherein said receiving at a network server comprises receiving at a server portion of a distributed application having the server portion and a plurality of client portions, at least one of the plurality of client portion being part of the transport services-related application computer program.

77. The method of claim 73, wherein:
said transport services-related computer program is further configured to encode said one or more messages so that said desired service can simultaneously be provided to two or more users, said simultaneous provision of the desired to two or more users comprises use of the same transportation modality for provision of the service so as to provides an economic benefit to at least one of: (i) the third party, or (ii) one or more others; and
said one or more messages are configured to cause instantiation of at least one user interface element on a display device of a personal electronic device of another user also in wireless communication with the network server, the at least one user interface element comprising a window or other display element by which the another user can initiate or authorize at least a portion of the simultaneous transport-related service.

78. A method of dynamically providing a location-based transport-related service for a user of a mobile electronic device such that the user does not have to know an address or zip code of a location where they desire the service to be performed, the mobile electronic device having a digital processor apparatus, a wireless interface in data communication with the digital processor apparatus, a storage device in data communication with the digital processor apparatus and having at least one application computer program disposed thereon, the at least one application program configured to be executed on at least the digital processor apparatus, a global positioning system (GPS) receiver capable of generating location data, and an input device in data communication with the digital processor apparatus, the method comprising:
receiving from a user of the mobile electronic device a selection of a location at which the transportation-related service is desired to be provided, the selection of the location based on at least location data generated by the GPS receiver and a user input via the input device, the location data relating to a then-current location of the mobile electronic device, the selection received by the at least one application computer program;
based at least on the receiving of the selection, substantially automatically generating one or more messages comprising at least: (i) information relating to the selected location; and (ii) data uniquely indicative of the user or an account associated therewith; and causing transmission of the one or more messages from the mobile electronic device to a remote networked server via at least the wireless interface and an interposed internetwork, the transmission of the one or more messages instigating provision of the transport-related service at the location by a third party transportation service.

79. The method of claim 78, further comprising:
saving the selected location at least on a storage device of the mobile electronic device along with at least one other previously saved selection location, and enabling subsequent recall of at least the selected location and the at least one other previously saved selected location via the at least one application computer program, for transmission to the remote networked server.

80. The method of claim 78, wherein the at least one application computer program comprises a transport service-related application computer program for download to the mobile electronic device and storage on the storage device, the transport service-related application computer program having been rendered in a Java-based computer programming language and being configured to enable establishment of a secure sockets layer (SSL) session with a remote network server, the transport service-related application program comprising logic configured to enable the user to pay for the desired transport-related service using the mobile electronic device and previously supplied credit card data of the user, a least a portion of the previously supplied credit card data retained in a secure data repository in data communication with the remote network server.

81. The method of claim 78, further comprising:
receiving via the at least one application computer program an electronic message from a remote networked server, the electronic message comprising at least information relating to: (i) a date and time the transportation-related service was performed, (ii) at least one of the then-current location or another location; and (iii) a payment method.

82. The method of claim 81, further comprising causing, via the at least one application computer program, establishment of a secure sockets layer (SSL) connection between at least the mobile electronic device and the remote networked server for transmission of the generated one or more messages.

83. The method of claim 78, further comprising receiving via said at least one application computer program an electronic message comprising an estimated time of completion of the desired service.

84. The method of claim 83, wherein said one or more generated messages are configured such that said transport-related service is at least in part simultaneously provided to two or more users, said simultaneous provision of the desired to two or more users comprises use of the same transportation modality for provision of the service so as to economize on transportation costs.

85. The method of claim 78, further comprising causing, via at least said at least one application computer program, instantiation of at least one user interface element on a display device of a personal electronic device of another user also in wireless communication with the remote networked server, the at least one user interface element comprising a window or other display element by which the another user can initiate or authorize at least a portion of the transportation-related service.

86. A method of adaptively providing a transportation-related service for a user of a type of mobile electronic device such that the user does not need to either (i) know an address, or (ii) enter textual data via a user interface for an address, for where the service is to be rendered, the mobile electronic device having a digital processor apparatus, a wireless interface in data communication with the digital processor apparatus, a storage device in data communication with the digital processor apparatus, the storage device capable of storing thereon at least one application computer program, a global positioning system (GPS) receiver capable of generating location data, and an input device and display device each in data communication with the digital processor apparatus, the method comprising:
- providing a transportation services-related application computer program configured for use on at least one mobile electronic device of the type;
- subsequent to said providing, conducting an authentication process comprising:
  - using a network server to authenticate said transportation services-related application computer program running on a mobile electronic device of the type; and
  - using said network server to enable authentication of said server by said transportation services-related application computer program running on the mobile electronic device;
- subsequent to said conducting said authentication process, receiving from the mobile electronic device at the network server, one or more electronic messages, the one or more messages collectively comprising at least: (i) information relating to a then-current location of the mobile electronic device, the information based at least in part on location data generated by the GPS receiver; and (ii) data uniquely indicative of the user or an account associated therewith, the one or more messages having been generated at least in part by the transportation service-related application computer program pursuant to the user's desire for the transportation-related service;
- based at least on the one or more messages, causing provision of the desired transportation-related service at the then-current location by a third party transportation service, the desired transportation-related service comprising movement of a land-based transportation modality to the then-current location;
- accessing, based at least one the data uniquely indicative of the user or an account associated therewith, financial payment source data of the user, the accessing the financial payment source data of the user comprising accessing a secure repository of credit card data, the repository in data communication with the network server, the secure repository comprising at least credit card data previously supplied by the user;
- utilizing the financial payment source data to cause payment for the desired transportation-related service;
- subsequently generating an electronic mail or message to the user, the generated mail or message comprising at least information relating to: (i) a date and time the transportation-related service was performed, (ii) at least one of the then-current location or another location; and (iii) a payment method; and
- causing transmission of the generated electronic mail or electronic message addressed to the user.

87. The method of claim 86, wherein:
- said transportation services-related application computer program is further configured to receive an electronic message comprising an estimated time of completion of the desired service; and
- said one or more electronic messages are configured such that said transportation-related service is at least in part simultaneously provided to two or more users, said simultaneous provision of the desired to two or more users comprises use of the same land-based transportation modality for provision of the service so as to economize on transportation costs.

88. The method of claim 87, wherein said one or more electronic messages are configured to cause instantiation of at least one user interface element on a display device of a personal electronic device of another user also in wireless communication with the network server, the at least one user interface element comprising a window or other display element by which the another user can initiate or authorize at least a portion of the desired transportation-related service provided via the same land-based modality.

89. The method of claim 86, wherein said conducting an authentication process comprises at least the network server using a challenge-based approach utilizing at least one RAND (random) value.

90. A method of adaptively providing a transportation-related service for a user of a type of mobile electronic device such that the user does not need to know an address for where the service is to be rendered, the mobile electronic device having a digital processor means, a means for wireless interface in data communication with the digital processor means, a means for data storage in data communication with the digital processor means, the means for data storage capable of storing thereon at least one application computer program, an assisted global positioning system (A-GPS) receiver capable of generating location data, an operating system, and a capacitive touch-screen input and display device means in data communication with the digital processor means, the method comprising:
- providing a transportation services-related application computer program means configured for use on at least one mobile electronic device of the type;
- at a later time, receiving from the mobile electronic device at a network server, one or more electronic messages, the one or more messages collectively comprising at least: (i) information relating to a then-current location of the mobile electronic device, the information based at least in part on location data generated by the A-GPS receiver; and (ii) data uniquely indicative of the user or an account associated therewith, the one or more messages having been generated at least in part by the transportation service-related application computer program means pursuant to the user's desire for the transportation-related service, at least a portion of the one or more messages having been secured by the at least one transportation service-related application computer program means according to a protocol-layer security process associated therewith;
- based at least on the one or more messages, causing provision of the desired transportation-related service at least at the then-current location by a third party transportation service, the desired transportation-related service comprising movement of a land-based transportation modality means to the then-current location;
- accessing, based at least one the data uniquely indicative of the user or an account associated therewith, financial payment source data of the user, the accessing the financial payment source data of the user comprising accessing a secure repository of credit card data, the repository in data communication with the network server, the secure repository comprising at least credit card data previously supplied by the user;

utilizing the financial payment source data to cause payment for the desired transportation-related service;

subsequently generating an electronic mail or message to the user, the generated mail or message comprising at least: (i) a date and time the transportation-related service was performed, (ii) at least one of the then-current location or another location; and (iii) a payment method; and causing transmission of the generated electronic mail or electronic message to the user; and further wherein:

said transportation services-related application computer program is further configured to receive an electronic message comprising an estimated time of completion of the desired service;

said one or more electronic messages are configured such that said transportation-related service is at least in part simultaneously provided to two or more users, said simultaneous provision of the desired to two or more users comprises use of the same land-based transportation modality means for provision of the service, said use of the same transportation modality means for provision of the service provides an economic benefit to at least one of: (i) the third party service, or, (ii) one or more others; and said one or more electronic messages are configured to cause instantiation of at least one user interface element on a display device of a personal electronic device of another user also in wireless communication with the network server, the at least one user interface element comprising a window or other display element means by which the another user can initiate or authorize at least a portion of the desired transportation-related service provided via the same land-based modality means.

91. A method of adaptively providing a transport-related service for a user of a type of cellular-enabled smartphone, such that the user does not need to know an address for where the service is to be rendered, the cellular-enabled smartphone comprising a digital processor apparatus, a wireless interface in data communication with the digital processor apparatus, a storage device in data communication with the digital processor apparatus, the storage device capable of storing thereon at least one application computer program, an assisted global positioning system (A-GPS) receiver capable of generating location data, and a touch-screen input device and display device each in data communication with the digital processor apparatus, the method comprising:

providing a transport service-themed application computer program configured for use on at least one cellular-enabled smartphone of the type;

establishing a data communications session between a network server apparatus and the transport service-themed application computer program operative on the cellular-enabled smartphone of the user, the communications session utilizing at least the wireless interface and an interposed internetwork for communication of data;

at a later time, receiving from the cellular-enabled smartphone of the user, and at the network server apparatus, one or more electronic messages, the one or more messages having been transmitted via at least the wireless interface, at least one of the one or more messages comprising information relating to a then-current location of the cellular-enabled smartphone, the information based at least in part on location data generated by the A-GPS receiver, the then-current location having been affirmatively selected by the user for provision of the transport-related service via a touch on a touch-sensitive screen of the input device, the one or more messages having been generated at least in part by the transport service-themed application computer program, at least a portion of the one or more electronic messages having been secured according to a protocol-layer security process associated with at least the session;

based at least on the one or more messages, enabling provision of the desired transport-related service at least at the then-current location by a third party transport service, the transport-related service comprising movement of a land-based transport modality of the third party transport service to the then-current location;

accessing credit card-related data previously supplied by the user and designated by the user as a payment source to cause payment for the transport-related service;

generating a first electronic mail or electronic message to at least one third party designated by the user, the generated first mail or message comprising information relating to at least an estimated time of completion of the transport-related service;

causing transmission of the generated first electronic mail or electronic message to the at least one third party;

subsequently generating a second electronic mail or electronic message to the user, the generated second mail or message comprising at least: (i) a date and time the transport-related service was performed, (ii) at least one of the then-current location or another location; and (iii) the payment source; and causing transmission of the generated second electronic mail or electronic message to the user.

92. The method of claim 91, wherein the method further comprises:

receiving at the network server apparatus a message initiated by the user of the cellular-enabled smartphone via the transport service-themed application computer program, the message intended ultimately for another user of another cellular-enabled smartphone in data communication with the network server apparatus, the message intended to cause the another user to take an action related to the provision of the transport-related service; and based at least on the message initiated by the user of the cellular-enabled smartphone, causing automatic instantiation of a window or display element on the another cellular-enabled smartphone of the another user, the window or display element prompting the another user to take the action.

93. The method of claim 92, wherein the method further comprises:

receiving at the network server apparatus a message initiated by the another user of the another cellular-enabled smartphone, the message in response to the prompting of the another user to take the action relating to the provision of the transport-related service; and based at least on the received message initiated by the another user, enable said causing provision of the desired service; and wherein the receiving at the network server apparatus a message initiated by the user of the cellular-enabled smartphone via the transport service-themed application computer program, the message intended ultimately for another user of another cellular-enabled smartphone in data communication with the network server apparatus, and the receiving at the network server apparatus a message initiated by the another user of the another cellular-enabled smartphone, the message in response to the prompting of the another user to take the action relating to the provision of the transport-related service, are each performed prior to the causing provision of the transport-related service.

94. The method of claim 92, wherein the transport service-themed application computer program comprises an application computer program rendered in an object-oriented programming language, and the automatic instantiation of a window or display element on the another cellular-enabled smartphone of the another user comprises instantiation of a display element in a corresponding transport service-themed object-oriented application computer program operative to run on the another cellular enabled smartphone.

95. Apparatus configured for adaptively providing a transport-related service for respective ones of a plurality of users of respective cellular-enabled smartphones from a substantially centralized location, such that none of the plurality of users (i) need to know an address for where their respective service is to be rendered, and (ii) need make a voice call or other voice-based communication to obtain the desired service, the cellular-enabled smartphones each comprising a digital processor apparatus, a wireless interface in data communication with the digital processor apparatus, a storage device in data communication with the digital processor apparatus, the storage device capable of storing thereon at least one application computer program, a radio frequency-based positioning system capable of generating location data, and an input device and display device each in data communication with the digital processor apparatus, the apparatus comprising:

a network server apparatus in data communication with a data internetwork, the network server apparatus comprising a server portion of a client-server computer program, the server portion configured to execute on the server apparatus and communicate via at least the data internetwork with a plurality of client portions disposed on respective ones of the cellular-enabled smartphones and operative to execute on the respective digital processor apparatus thereof; and a plurality of client portions of the client-server computer program, the client portions disposed on the respective ones of the cellular-enabled smartphones, the client portions each comprising a transport service-themed application computer program written in a Java programming language;

wherein the server portion and the client portions are, as applicable, configured to, when executed:

establish a plurality of respective data communications sessions between the network server apparatus and respective ones of the transport service-themed application computer programs operative on the cellular-enabled smartphones of the respective plurality of users, the communications sessions each utilizing at least the respective smartphone's wireless interface, and the data internetwork for communication of data;

at respective ones of later times, transmit from the respective cellular-enabled smartphones, and receive at the network server apparatus, one or more electronic messages, the one or more messages transmitted via at least the respective smartphone's wireless interface, at least one of the one or more messages comprising information relating to a then-current location of the respective cellular-enabled smartphone, the information based at least in part on location data generated by the positioning system of that smartphone, the then-current location having been affirmatively selected by the respective user of that smartphone for provision of the transport-related service for the respective user via the respective input device, the one or more messages having been generated at least in part by the transport service-themed application computer program of that smartphone, at least a portion of the one or more electronic messages having been secured according to a protocol-layer security process associated with at least the session associated with that smartphone;

based at least on the one or more messages, cause provision of the respective desired transport-related service at least at the respective one of the then-current location by a third party transport service, the respective transport-related service comprising movement of a land-based transport modality of the third party transport service to the respective then-current location, the causation of provision enabled by the network server apparatus;

access credit card-related data previously supplied by the respective user and designated by the respective user as a payment source to cause payment for the respective transport-related service;

generate a respective one of a first electronic mail or electronic message to at least one respective third party designated by the respective user, the generated first mail or message comprising information relating to at least an estimated time of completion of the respective transport-related service;

cause transmission of the generated respective first electronic mail or electronic message to the at least one respective third party;

subsequently generate a respective one of a second electronic mail or electronic message to the user, the generated second mail or message comprising at least: (i) a date and time the respective transport-related service was performed, (ii) at least one of the respect then-current location or another location; and (iii) the respective payment source; and cause transmission of the generated respective second electronic mail or electronic message to the respective user.

96. A method utilized by an electronic proxy agent for one or more third-party transportation service providers, the method to cause substantially automated provision of a transportation-related service for a user of a type of mobile electronic device, the mobile electronic device having a digital processor apparatus, a wireless interface in data communication with the digital processor apparatus, a storage device in data communication with the digital processor apparatus, the storage device capable of storing thereon at least one application computer program, a radio-frequency-based positioning system capable of generating location data, and an input device and display device each in data communication with the digital processor apparatus, the method enabling the user to obtain the transportation-related service without knowing an address for where the transportation-related service is to be rendered, and without conducting a voice communication with any of the one or more third-party transportation service providers, the method comprising:

receiving from the mobile electronic device, via a previously established secure communications session between the electronic proxy agent and the mobile electronic device, one or more electronic messages, the one or more messages collectively comprising at least: (i)

information relating to a then-current location of the mobile electronic device, the information based at least in part on location data generated by the positioning system; and (ii) data uniquely indicative of the user or an account associated with the user, the one or more messages having been generated at least in part by a transportation service-related application computer program operative on the mobile electronic device, the one or more messages configured for transmission to the electronic proxy agent and being generated in response to an input of the user;

using the electronic proxy agent to, based at least on the one or more received messages, facilitate provision of the transportation-related service at the then-current location by one of the one or more third-party transportation service providers, the transportation-related service comprising movement of a land-based transportation modality of the one service provider to the then-current location;

using the electronic proxy agent to cause access of, based at least one the data uniquely indicative of the user or an account associated with the user, financial payment source data of the user, the access of the financial payment source data of the user comprising accessing a secure repository of credit card data, the repository in data communication with the electronic proxy agent, the secure repository comprising at least credit card data previously supplied by the user for storage therein;

utilizing the accessed financial payment source data to cause payment for at least a portion of the transportation-related service;

subsequently generating an electronic mail or message addressed to the user, the generated mail or message comprising at least: (i) a date and time the transportation-related service was performed, (ii) a location; and (iii) information indicative of a credit card associated with the credit card data; and causing transmission of the generated electronic mail or electronic message to the user via a mail or message server, such that the user can selectively view the generated mail or message at a later time if desired by accessing the mail or message server.

97. The method of claim 96, wherein the method further comprises causing, by way of the electronic proxy agent and based at least in part on a communication initiated from the transportation-related service application computer program, instantiation of a display element on a display device of a mobile electronic device of a second user in data communication with the proxy agent, the display element instigating the second user to provide an input causing an action relating to the transportation-related service.

98. A method of dynamically providing a location-based transport-related service for a user of a mobile electronic device, the user not having to know the address of a location where they desire the service to be performed, the mobile electronic device having a digital processor apparatus, a wireless interface in data communication with the digital processor apparatus, a storage device in data communication with the digital processor apparatus and having at least application computer program disposed thereon, the at least one application program configured to be executed on at least the digital processor apparatus, an assisted global positioning system (A-GPS) receiver capable of generating location data, and an input device in data communication with the digital processor apparatus, the method comprising:

receiving a user selection of a desired transport-related service via the input device, a selection received by the at least one application computer program;

based at least on the receiving of the selection, generating one or more electronic messages for transmission via an internetwork to a network server apparatus in data communication therewith, the one or more electronic messages comprising at least: (i) information relating to a then-current location of the mobile electronic device, the information based at least in part on location data generated by the GPS receiver; and (ii) data uniquely indicative of the user or an account associated therewith; and causing transmission of the one or more messages from the mobile electronic device to the network server apparatus via at least the wireless interface and an interposed internetwork, the transmission of the one or more messages instigating provision of the desired transport-related service at the location by a third party transportation service.

99. The method of claim 98, wherein the desired transport-related service comprises delivery of one or more items that the user needs.

100. The method of claim 99, wherein the one or more items that the user needs comprises one or more substantially liquefied substances in a container.

101. The method of claim 99, wherein the one or more items that the user needs comprises apparatus enabling access to at least an interior of an automobile.

102. The method of claim 101, wherein the apparatus enabling access to at least an interior of an automobile comprises at least one automobile key.

103. The method of claim 98, wherein the mobile electronic device comprises a cellular enabled smartphone capable of executing a computer program rendered in an object oriented programming language, and the method further comprises providing the at least one application computer program for download to the mobile electronic device, the at least one application computer program comprising a theme relating to provision of transport-related services and having been rendered primarily in a Java-based programming language.

104. The method of claim 98, wherein the mobile electronic device further comprises a display device in data communication with the digital processor apparatus, the display device and input device collectively comprising a capacitive touch screen input and display device; and wherein said application computer program is configured to generate a user interface having at least one soft function key, said at least one soft function key enabling said generation and causing transmission of at least one of said one or more messages without further user intervention; and wherein the at least one application computer program is configured to instantiate, based on a communication from a remotely disposed mobile electronic device, a display element or window on the display device, the display element or window prompting the user for an input relating to the transport-related service.

105. The method of claim 104, wherein the at least one application computer program comprises a theme relating to provision of transport-related services, and is further configured to receive an electronic message comprising an estimated time of provision of the transport-related service, the message generated by the network server apparatus.

106. The method of claim 105, wherein:

the desired transport-related service comprises delivery of one or more items that the user needs, the one or more items that the user needs comprising at least one of: (i) a substantially liquefied substance in a container, and/or (ii) automobile key apparatus configured to enable access to at least an interior of an automobile; and wherein the mobile electronic device further comprises a display device in data communication with the digital processor apparatus, the display device and input device comprising a capacitive touch screen input and display device; and wherein said application computer program is configured to generate a user interface having at least one soft function key, said at least one soft function key enabling said generating and causing transmission of at least one of said one or more messages without further user intervention.

107. The method of claim 98, wherein the mobile electronic device further comprises a short-range radio frequency interface in data communication with the at least one computer program, the short-range interface disposed within the mobile electronic device at the time of manufacture of the mobile electronic device, and the method further comprises using the at least one computer program configured to cause the short-range interface to exchange data with an external radio frequency device.

108. The method of claim 107, wherein the short-range interface comprises a Bluetooth compliant wireless interface, and the exchanged data relates to the provision of the transport-related service by the third-party transportation service.

109. The method of claim 107, wherein the short-range interface comprises a Bluetooth compliant wireless interface, and the exchanged data comprises the location data.

110. The method of claim 107, wherein the short-range interface comprises an RFID (radio frequency ID)-based wireless interface, and the exchanged data relates to financial account data of the user.

111. The method of claim 98, wherein said transmission of the one or more messages from the mobile electronic device to the network server apparatus via at least the wireless interface comprises transmission via a wireless interface utilizing an OFDM (orthogonal frequency division multiplexed) protocol, the wireless interface utilizing said OFDM protocol to at least mitigate interference with other radio frequency communications devices.

112. The method of claim 98, wherein said transmission of the one or more messages from the mobile electronic device to the network server apparatus via at least the wireless interface comprises transmission via a plurality of radio frequency carriers, and via a plurality of different time periods, so as to at least mitigate interference with other radio frequency communications devices within the same frequency band.

113. The method of claim 112, wherein said transmission via a plurality of radio frequency carrier frequencies comprises modulating data onto at least a portion of said radio frequency carriers using binary phase shift keying (BPSK) modulation.

114. The method of claim 98, further comprising:
causing, via the application computer program, establishment of a secure sockets layer (SSL) connection between at least the mobile electronic device and the network server apparatus for transmission of the generated one or more messages; and
receiving via the application computer program an electronic message from a remote networked server, the electronic message comprising at least: (i) a date and time the transportation-related service was performed, and (ii) at least one of the then-current location or another location.

115. A method utilized by a network proxy agent for one or more third-party transportation service providers, the method to cause provision of a transportation-related service for a user of a mobile electronic device, the mobile electronic device having a digital processor apparatus, a wireless interface in data communication with the digital processor apparatus, a storage device in data communication with the digital processor apparatus, the storage device capable of storing thereon at least one application computer program, a radio-frequency-based positioning system capable of generating location data, and an input device and display device each in data communication with the digital processor apparatus, the method enabling the user to obtain the transportation-related service without knowing an address for where the transportation-related service is to be rendered, the method comprising:
receiving from the mobile electronic device, via a previously established communications session between the proxy agent and the mobile electronic device, one or more electronic messages, the one or more messages collectively comprising at least: (i) information relating to a then-current location of the mobile electronic device, the information based at least in part on location data generated by the positioning system; and (ii) data uniquely indicative of the user or an account associated with the user, the one or more messages having been generated at least in part by a transportation service-themed application computer program operative on the mobile electronic device, the one or more messages configured for transmission to the proxy agent and being generated in response to an input of the user received via the input device;
using the proxy agent to, based at least on the one or more received messages, facilitate provision of the transportation-related service at the then-current location by one of the one or more third-party transportation service providers, the transportation-related service comprising movement of a land-based transportation modality of the one service provider to the then-current location in order to provide at least one chattel to the user at the then-current location; and
using the proxy agent to cause generation and transmission to the user of an electronic message comprising an estimated time of provision of the transportation-related service to the user.

116. The method of claim 115, wherein the at least one chattel comprises one or more substantially liquefied substances disposed in a container.

117. The method of claim 115, wherein the at least one chattel comprises apparatus enabling access to at least an interior of an automobile.

118. The method of claim 116, wherein the apparatus enabling access to at least an interior of an automobile comprises at least one automobile key.

119. The method of claim 115, wherein the at least one chattel comprises one or more tools.

120. The method of claim 115, wherein the input device and display device collectively comprise a capacitive touch screen input and display device of the mobile electronic device; and
wherein said transportation service-themed application computer program is configured to generate a user interface having at least one soft function key, said at least one soft function key enabling, when selected by said user via the capacitive touch screen input and display device, said generation and causing transmission of at least one of said one or more messages without further user intervention.

121. The method of claim 120, further comprising enabling, via at least the proxy agent, establishment of a secure sockets layer (SSL) connection between at least the mobile electronic device and the network server apparatus for transmission of the received one or more messages and the electronic message comprising an estimated time of provision, the session utilizing the connection.

122. The method of claim 120, wherein the transportation services-themed application computer program comprises a computer program rendered in a Java-based programming language, and the method further comprises causing, from the proxy agent, the transportation services-themed application computer program to instantiate a display element or window on the display device, the display element or window prompting the user for an input relating to the transport-related service, the input required before the at least one chattel can be provided at the then-current location.

123. The method of claim 122, further comprising:
using the proxy agent for accessing, based at least one the data uniquely indicative of the user or an account associated with the user, account data of the user, the access of the account data of the user comprising accessing a secure repository of user data, the repository in data communication with the proxy agent, the secure repository comprising at least data previously supplied by the user for storage therein; and
utilizing the accessed data to verify that the user is authorized for provision of the transportation-related service by one of the third-party providers.

124. A method utilized by an electronic network proxy agent comprising a network server, the method to cause provision of a delivery one or more chattels to a user of a mobile electronic device, the one or more chattels having been specifically designated by the user, the mobile electronic device having a digital processor apparatus, a wireless interface in data communication with the digital processor apparatus, a storage device in data communication with the digital processor apparatus, the storage device capable of storing thereon at least one application computer program, a radio-frequency-based positioning system capable of generating location data, and a capacitive touch screen input and display device in data communication with the digital processor apparatus, the method enabling the user to obtain the one or more chattels in substantially automated fashion and without having to specifically enter address data for where the one or more chattels is/are to be delivered, the method comprising:
enabling establishment of a secure communication session between at least a Java-based application computer program operative on the mobile electronic device and the electronic proxy agent, said application computer program configured to generate a user interface having at least one soft function key;
receiving from the mobile electronic device, via the communications session between the electronic proxy agent and the mobile electronic device, one or more electronic messages, the one or more messages collectively comprising at least: (i) information relating to a then-current location of the mobile electronic device, the information based at least in part on location data generated by the positioning system; and (ii) data uniquely relating to the mobile device or an account associated with the user, the one or more messages having been generated at least in part by the application computer program, the one or more messages configured for transmission to the electronic proxy agent and being generated at least partly in response to an input of the user received via the touch screen input and display device, the input of the user to designate at least one of the designated one or more chattels, the input received via at least one soft function key displayed on the capacitive touch screen input and display device;
using the electronic proxy agent to, based at least on the one or more received messages, facilitate provision of the delivery of the designated one or more chattels at the then-current location by one of the one or more third-party transportation service providers, the delivery comprising movement of a land-based transportation modality of the one service provider to the then-current location in order to provide the designated one or more chattels to the user;
using the electronic proxy agent to cause generation and transmission to the user of an electronic message comprising an estimated time of delivery to the user.

125. The method of claim 124, wherein the at least one chattel comprises one or more of (i) a substantially liquefied substance disposed in a container; (ii) at least one automobile key; and/or (iii) one or more tools.

126. The method of claim 125, wherein the at least one application computer program comprise a transportation services-themed application computer program, and the method further comprises causing, from the proxy agent, the transportation services-themed application computer program to instantiate a display element or window on the display device, the display element or window prompting the user for an input relating to the transport-related service, the input required before the at least one chattel can be provided at the then-current location.

127. The method of claim 125, further comprising:
using the electronic proxy agent for accessing, based at least one the data uniquely indicative of the mobile device or an account associated with the user, account data of the user, the access of the account data of the user comprising accessing a secure repository of user data, the repository in data communication with the electronic proxy agent, the secure repository comprising at least data previously supplied by the user for storage therein; and
utilizing the accessed data to verify that the user is authorized for provision of the transportation-related service by one of the third-party providers.

128. The method of claim 127, wherein:
the accessing a secure repository of user data, the repository in data communication with the electronic proxy agent, the secure repository comprising at least data previously supplied by the user for storage therein, comprises accessing credit-card data previously supplied by the user and stored within the repository; and
the utilizing the accessed data to verify that the user is authorized for provision of the transportation-related service by one of the third-party providers comprises using the accessed credit-card data to pay for at least a portion of the delivery of the one or more chattels.

129. A method of opportunistically providing delivery of a chattel for a user of a mobile electronic device, the user not having to know or manually enter any portion of an address of a location where they desire the chattel to be delivered, the mobile electronic device having a digital processor apparatus, a cellular or Wi-Fi-based wireless interface in data communication with the digital processor apparatus, a short-range wireless interface in data communication with the digital processor apparatus, a storage device in data communication with the digital processor apparatus and having at least application computer program disposed thereon, the at least one application program configured to be executed on at least the digital processor apparatus, and an input device in data communication with the digital processor apparatus, the method comprising:

opportunistically establishing a communications session between the mobile electronic device and a computerized electronic device having a complementary short-range wireless interface operative thereon;

receiving via the short-range wireless interface of the mobile electronic device, data from the computerized electronic device, the data relating to location data generated by a radio-frequency-based positioning apparatus of the computerized electronic device when the computerized device was previously disposed at a location;

receiving a user selection of a desired chattel to be delivered, the user selection received via the input device and provided to the at least one application computer program;

based at least on the receiving of the selection, generating one or more electronic messages for transmission via an internetwork to a network server apparatus in data communication therewith, the one or more electronic messages comprising at least: (i) information relating to the location; and (ii) data uniquely indicative of the user or an account associated therewith; and causing transmission of the one or more messages from the mobile electronic device to the network server apparatus via at least the cellular or Wi-Fi-based wireless interface and an interposed internetwork, the transmission of the one or more messages instigating provision of the desired delivery of the chattel at the location by a third party service.

130. The method of claim 129, wherein:
the short-range wireless interface comprises a Bluetooth-compliant interface; and
the user encounters the computerized electronic device while present in a facility having a plurality of other persons also present therein or thereat, the computerized electronic device comprising a kiosk.

131. The method of claim 129, wherein:
the short-range wireless interface comprises a Bluetooth-compliant interface; and
the radio-frequency-based positioning apparatus comprises a global positioning system (GPS)-based receiver; and
the computerized electronic device comprises another mobile electronic device having a corresponding one of the application computer program thereon.

132. The method of claim 131, wherein the opportunistically establishing a communications session between the mobile electronic device and a computerized electronic device having a complementary short-range wireless interface operative thereon comprises establishing a communications session between the corresponding one of the application computer program and the application computer program of the mobile electronic device, the session instigated by the user of the mobile electronic device via the application computer program.

133. The method of claim 131, causing access of, based at least one the data uniquely indicative of the user or an account associated with the user, financial payment source data of the user, the access of the financial payment source data of the user comprising accessing a secure repository of credit card data, the repository in data communication with the electronic proxy agent, the secure repository comprising at least credit card data previously supplied by the user for storage therein, the accessed financial payment source data useful for payment for at least a portion of the delivery of the chattel; and subsequently generating an electronic mail or message addressed to the user, the generated mail or message comprising at least: (i) a date and time the delivery was performed, (ii) a location; and (iii) information indicative of a credit card associated with the credit card data; and causing transmission of the generated electronic mail or electronic message to the user via a mail or message server, such that the user can selectively view the generated mail or message at a later time if desired by accessing the mail or message server.

134. The method of claim 131, further comprising establishing a secure sockets layer (SSL)-enabled communications session between the application computer program of the mobile electronic device and the network server apparatus, the session instigated by the user of the mobile electronic device via the application computer program.

135. A method of providing provision of a service for a user of a mobile electronic device, the user not having to know or manually enter any part of an address of a location where they desire the service to be delivered, the mobile electronic device having a digital processor apparatus, a long-range wireless interface in data communication with the digital processor apparatus, a short-range wireless interface in data communication with the digital processor apparatus, a storage device in data communication with the digital processor apparatus and having at least one application computer program disposed thereon, the at least one application computer program configured to be executed on at least the digital processor apparatus, an assisted global positioning system (A-GPS)-base location apparatus capable of generating data relating to a location of the mobile electronic device, and an input device in data communication with the digital processor apparatus, the method comprising:

establishing a communications session between the mobile electronic device and a computerized electronic device having a complementary short-range wireless interface operative thereon;

receiving via the short-range wireless interface of the mobile electronic device, data from the computerized electronic device, the data relating to a desired service to be provided to the user, the received data provided to the at least one application computer program;

based at least on the receiving of the selection, generating one or more electronic messages for transmission via an internetwork and using a transmission control protocol and Internet protocol (TCP/IP) to a network server apparatus in data communication therewith, the network server apparatus in data communication with one or more third-party providers of service, the one or more electronic messages comprising at least: (i) information relating to the location of the mobile electronic device; and (ii) data uniquely indicative of the user or an account associated therewith; and causing transmission of the one or more messages from the mobile electronic device to the network server apparatus via at least the long-range wireless interface and an interposed internetwork, the transmission of the one or more messages enabling provision of the desired service at the location by at least one of the one or more third-party providers.

136. The method of claim 135, wherein the mobile electronic device comprises a cellular-enabled smartphone, and the computerized electronic device comprises both (i) a capacitive touch screen input and display device and (ii) a voice recognition apparatus operative thereon, the touch screen input and display device and the voice recognition apparatus configured to receive a selection of the desired service.

137. The method of claim 136, wherein the computerized electronic device comprises a wristwatch form factor, the computerized electronic device configured to be encoded by the user with user-specific data after manufacture and acquisition thereof.

138. The method of claim 136, wherein the application computer program of the mobile electronic device comprises a Java-based transport services-themed application, and the method further comprising establishing a secure sockets layer (SSL)-enabled communications session between the application computer program of the mobile electronic device and the network server apparatus, the session instigated by the user of the mobile electronic device via the application computer program, the session instigated by the user selecting the desired service via the touch screen input and display device computerized electronic device, the desired service further comprising delivery of one or more chattel to the user at the location.

139. The method of claim 138, wherein the one or more chattel comprises one or more substantially liquefied substances disposed in a container.

140. The method of claim 138, wherein the one or more chattel comprises one or more of (i) tools, and/or (ii) an automobile key apparatus enabling entry to an automobile.

141. Mobile computerized electronic apparatus configured to enable provision of one or more services to a user thereof, the computerized electronic apparatus comprising:
 a digital processing apparatus;
 a capacitive touch screen input and display device in data communication with the digital processing apparatus;
 a cellular wireless interface in data communication with the digital processing apparatus and configured to transmit data wirelessly from the mobile computerized electronic apparatus to a receiver;
 a global positioning system (GPS)-based receiver apparatus in data communication with the digital processing apparatus, the receiver apparatus configured to generate data relating to a location of the mobile computerized electronic apparatus;
 a Bluetooth-compliant radio frequency transceiver in data communication with the digital processing apparatus, the radio frequency transceiver configured to communicate with a complementary Bluetooth radio frequency transceiver of a personal electronic device in order to permit user data to be exchanged between the personal electronic device and mobile computerized electronic apparatus;
 speech processing apparatus in data communication with the digital processing apparatus and comprising at least one speech processing computer program operative to run thereon, the at least one speech processing computer program operative to convert received user speech to a digital representation thereof; and
 a storage device in data communication with the digital processing apparatus, the storage device comprising at least one computer program operative to run on said digital processing apparatus, said at least one computer program configured to, when executed:
  encode one or more electronic messages for delivery to a remote network server, the one or more electronic messages including at least a portion of the data relating to the location of the mobile computerized electronic apparatus generated by the GPS-based receiver; and
  transmit the one or more electronic messages to the remote network server via at least the cellular wireless interface in order to enable the provision of a first service to the user via the mobile computerized electronic device, the first service provided by a third-party service provider.

142. The mobile computerized electronic apparatus of claim 141, wherein the first service comprises a location-based service.

143. The mobile computerized electronic apparatus of claim 142, wherein the location-based service comprises delivery of data useful to the user at the location.

144. The mobile computerized electronic apparatus of claim 142, wherein the at least one computer program operative to run on said digital processing apparatus comprises an application computer program having at least one theme, the at least one theme comprising entertainment, and the provision of the first service to the user via the mobile computerized electronic device comprises streaming of data via the cellular wireless interface from the remote network server or a proxy thereof, the streamed data comprising music data.

145. The mobile computerized electronic apparatus of claim 144, wherein the mobile computerized electronic apparatus is a mounted part of a mobile vehicle capable of moving to a plurality of different locations.

146. The mobile computerized electronic apparatus of claim 145, wherein the at least one computer program is configured to utilize the digital representation of user speech to cause encoding of one or more electronic messages for delivery to a network server apparatus, the one or more electronic messages including at least a portion of the digital representation; and
 transmit the one or more electronic messages to the network server apparatus via at least the cellular wireless interface in order to enable on-demand provision of the first service to the user via the mobile computerized electronic device.

147. The mobile computerized electronic apparatus of claim 146, wherein the network server apparatus comprises the remote network server.

148. The mobile computerized electronic apparatus of claim 146, wherein the streamed music data comprises music data rendered in a Motion Picture Experts Group Audio (MP3) format.

149. The mobile computerized electronic apparatus of claim 146, wherein the streamed music data comprises music data rendered in a lossy compression format.

150. The mobile computerized electronic apparatus of claim 149, wherein the lossy compression format comprises a Motion Picture Experts Group Audio (MP3) format.

151. The mobile computerized electronic device of claim 149, wherein the lossy compression format comprises a code excited linear prediction (CELP)-based format.

152. The mobile computerized electronic apparatus of claim 146, wherein the at least one computer program operative to run on said digital processing apparatus further comprises an application computer program having at least one theme, the at least one theme comprising Internet access, the application computer program further comprising access for the user to at least one Internet search engine, and the provision of the first service to the user via the mobile computerized electronic device comprises download of content data via the cellular wireless interface from a service provider Internet website located using the Internet search engine.

153. The mobile computerized electronic apparatus of claim 152, further comprising a short-range radio frequency interface in data communication with the digital processing apparatus and the at least one computer program, the at least one computer program configured to cause the short-range interface to exchange data with a portable radio frequency device carried by the user when the portable radio frequency device is within communications range of the short-range radio frequency interface, the exchanged data enabling the user to actuate one or more functions of the mobile computerized electronic device.

154. The mobile computerized electronic apparatus of claim 153, wherein the short-range interface is configured to exchange data with a portable radio frequency device carried by the user only after successful authentication of the portable radio frequency device via a challenge-based protocol utilizing at least one randomized value (RAND).

155. The mobile computerized electronic apparatus of claim 153, wherein the mobile computerized electronic device is part of a vehicle capable of moving from one location to another, and comprises a compartment secured by at least one lockable door, the at least one door selectively unlocked based at least in part on said successful authentication.

156. The mobile computerized electronic apparatus of claim 141, further comprising a short-range radio frequency interface in data communication with the digital processing apparatus and the at least one computer program, the at least one computer program configured to cause the short-range interface to exchange data with a portable radio frequency device carried by the user when the portable radio frequency device is within communications range of the short-range radio frequency interface, the exchanged data enabling the user to actuate one or more functions of the mobile computerized electronic device.

157. The mobile computerized electronic apparatus of claim 141, further comprising:
  a first radio frequency interface in data communication with the digital processing apparatus and the at least one computer program; and
  a second radio frequency interface in data communication with the digital processing apparatus and the at least one computer program;
  wherein the at least one computer program configured to cause the first radio frequency interface to exchange data with a portable radio frequency device carried by the user when the portable radio frequency device is within communications range of the first radio frequency interface, the exchanged data enabling the user to actuate one or more functions of the mobile computerized electronic device via at least the second radio frequency interface.

158. The mobile computerized electronic apparatus of claim 157, wherein the actuation of one or more functions of the mobile computerized electronic device via at least the second radio frequency apparatus comprises actuation initiated by the user via at least one of the capacitive touch screen input and display device, and the speech processing apparatus.

159. The mobile computerized electronic apparatus of claim 157, further comprising a universal serial bus (USB) interface in data communication with the digital processing apparatus, the USB interface configured to communicate with a personal electronic device in order to permit user data to be transferred from the personal electronic device and mobile computerized electronic apparatus.

160. The mobile computerized electronic apparatus of claim 159, wherein the at least one computer program operative to run on said digital processing apparatus further comprises an application computer program having at least one theme, the at least one theme comprising entertainment, and the data exchanged between the personal electronic device and the mobile computerized electronic apparatus via the Bluetooth-compliant transceiver comprises music data.

161. The mobile computerized electronic apparatus of claim 160, wherein the music data comprises data formatted according a Motion Picture Experts Group Audio (MP3) format.

162. The mobile computerized electronic apparatus of claim 161, wherein the mobile computerized electronic apparatus is a mounted part of a mobile vehicle capable of moving to a plurality of different locations.

163. The mobile computerized electronic apparatus of claim 162, wherein the mobile computerized electronic apparatus further comprises a Wi-Fi compliant wireless interface in data communication with the digital processing apparatus and configured to operate utilizing an orthogonal frequency division multiplexing (OFDM) modulation scheme; and
  wherein:
    the cellular wireless interface comprises an interface also utilizing an OFDM modulation scheme; and
    the use of the OFDM modulation scheme of at least one of Wi-Fi compliant interface and the cellular interface is selected to mitigate radio frequency interference with at least one radio frequency emitter.

164. The mobile computerized electronic apparatus of claim 162, wherein:
  the mobile computerized electronic apparatus further comprises a Wi-Fi compliant wireless interface in data communication with the digital processing apparatus and configured to operate utilizing an orthogonal frequency division multiplexing (OFDM) modulation scheme;
  the cellular wireless interface comprises a Third Generation (3G) wireless interface compliant with at least one of a 3GPP (Third Generation Partnership Project) and UMTS (Universal Mobile Telecommunications System) standard;
  the first radio frequency interface comprises a radio frequency ID (RFID)-based radio frequency interface comprising an interrogator apparatus capable of interrogating the portable radio frequency device when the portable radio frequency device is within the communications range; and
  the second radio frequency interface comprises apparatus thereof configured to implement a security policy so as to prevent surreptitious interception or use of data transmitted from the second radio frequency interface.

165. The mobile computerized electronic apparatus of claim 164, wherein said personal electronic device comprised a cellular-enabled smartphone, and the at least one computer program is configured to interface, via at least the cellular wireless interface, with a remote networked server, the remote networked server configured to enable communication with an application computer program disposed on the personal electronic device of the user, such that the user can transfer user data between the personal electronic device and the mobile computerized electronic apparatus via at least the remote networked server and the cellular wireless interface.

166. The mobile computerized electronic apparatus of claim 165, wherein said application computer program disposed on the personal electronic device of the user comprises a transportation-themed application program, and the application computer program is further configured to establish a secure sockets layer (SSL) session with at least the remote networked server, the session utilized to securely transfer the user data between the personal electronic device and the remote networked server.

167. The mobile computerized electronic apparatus of claim 165, wherein the at least one computer program of the mobile computerized electronic apparatus is further configured to cause encoding and transmission of at least one message to the cellular-enabled smartphone via at least the cellular wireless interface, the at least one message comprising data relating to an estimated time of completion of a service being performed for the user.

168. The mobile computerized electronic apparatus of claim 165, wherein the at least one computer program of the mobile computerized electronic apparatus is further configured to cause encoding and transmission of at least one message to the cellular-enabled smartphone via at least the cellular wireless interface, the at least one message comprising data relating to an estimated time of completion of a service being performed for the user.

169. The mobile computerized electronic apparatus of claim 141, further comprising at least one communication apparatus in data communication with the digital processing apparatus and the at least one computer program, the communication apparatus enabling at least user packet-based voice communication with a remote customer service agent, the packet-based voice communication utilizing at least a transport control protocol (TCP) for packet transport over an internetwork interposed between the customer service agent and the mobile computerized electronic apparatus.

170. The mobile computerized electronic apparatus of claim 141, wherein the at least one computer program and is further configured to establish, based at least on a second digitized representation generated by the speech processing apparatus, a communication session with a remote customer service entity whereby the user can communicate spoken information that has been converted to a textual representation to the customer service entity, the communication occurring over at least the cellular wireless interface.

171. The mobile computerized electronic apparatus of claim 170, wherein the at least one computer program and is further configured to, in response to the receipt of the second digitized representation, automatically encode and transmit at least one electronic message comprising the at least the data relating to the location to the remote customer service entity.

172. Mobile computerized electronic apparatus configured to enable provision of one or more location-based services to a user thereof via one or more of a plurality of wireless interfaces, and without the user having to know or manually enter an address of the mobile electronic apparatus, the computerized electronic apparatus comprising:
 a digital processing apparatus;
 a capacitive touch screen input and display device in data communication with the digital processing apparatus;
 a cellular wireless interface in data communication with the digital processing apparatus and configured to transmit data wirelessly from the mobile computerized electronic apparatus to a receiver;
 a wireless interface compliant with an IEEE 802.11 standard and in data communication with the digital processing apparatus and configured to transmit data wirelessly from the mobile computerized electronic apparatus to a receiver;
 a global positioning system (GPS)-based wireless receiver apparatus in data communication with the digital processing apparatus, the receiver apparatus configured to generate data relating to a location of the mobile computerized electronic apparatus;
 speech processing apparatus in data communication with the digital processing apparatus and comprising at least one speech processing computer program operative to run thereon, the at least one speech processing computer program operative to convert received user speech to a digital representation thereof; and
 a storage device in data communication with the digital processing apparatus, the storage device comprising: (i) at least one first computer program operative to run on said digital processing apparatus, said at least one first computer program configured to, when executed:
  receive the digitized representation from the speech processing apparatus;
  encode one or more electronic messages for delivery to a first remote network server, the one or more electronic messages including at least a portion of the data relating to the location of the mobile computerized electronic apparatus generated by the GPS-based receiver; and
  transmit the one or more electronic messages to the first remote network server via at least one of the cellular wireless interface and/or the 802.11-compliant interface in order to enable the provision of a first location-based service to the user of the mobile computerized electronic device, the provision of the first location-based service based at least in part on the one or more electronic messages;
 and (ii) at least one second computer program operative to run on said digital processing apparatus, said at least one second computer program configured to, when executed:
  encode one or more second electronic messages for delivery to a second remote network server, the one or more second electronic messages including at least a portion of the data relating to the location of the mobile computerized electronic apparatus generated by the GPS-based receiver; and
  transmit the one or more second electronic messages to the second remote network server via at least the 802.11-compliant interface in order to enable the provision of a second location-based service to the user of the mobile computerized electronic device.

173. The mobile computerized electronic apparatus of claim 172, wherein:
 the at least one computer program operative to run on said digital processing apparatus comprises an application computer program having at least one theme, the at least one theme comprising entertainment, and the provision of the first service to the user of the mobile computerized electronic device comprises streaming of data via the cellular wireless interface from the first remote network server or a proxy thereof, the streamed data comprising music data encoded according to at least a lossy compression format and transmitted over the Internet; and
 the second location-based service comprises download of a data file, the data file selected based at least in part on the at least a portion of the data relating to the location.

174. The mobile computerized electronic apparatus of claim 172, wherein:
 the at least one computer program operative to run on said digital processing apparatus comprises an application computer program having at least one theme, the at least one theme comprising entertainment, and the provision of the first service to the user of the mobile computerized electronic device comprises streaming of data via the cellular wireless interface from the first remote network server or a proxy thereof, the streamed data comprising packetized music data transmitted over the Internet using at least a transport control protocol (TCP); and the second location-based service comprises registration of at least one of the user and/or the mobile computerized electronic apparatus in a remotely maintained database, the registration based at least in part on the at least a portion of the data relating to the location.

175. The mobile computerized electronic apparatus of claim 172, wherein the at least one computer program operative to run on said digital processing apparatus further comprises an application computer program having at least one theme, the at least one theme comprising Internet access, the application computer program further comprising access for the user to at least one Internet search engine using at least the capacitive touch screen input and display device, and the provision of the second service to the user via the mobile computerized electronic device comprises download of content data via the 802.11-compliant wireless interface from a service provider Internet website located using the Internet search engine, at least a portion of the content data configured based at least in part on the at least a portion of the data relating to the location.

176. The mobile computerized electronic apparatus of claim 172, further comprising a short-range radio frequency interface in data communication with the digital processing apparatus and the at least one computer program, the at least one computer program configured to cause the short-range interface to exchange data with a portable radio frequency device carried by the user when the portable radio frequency device is within communications range of the short-range radio frequency interface, the exchanged data enabling the user to actuate one or more functions of the mobile computerized electronic device, the short-range interface configured to exchange data with a portable radio frequency device carried by the user only after successful authentication of the portable radio frequency device via a challenge-based protocol utilizing at least one randomized data value (RAND).

177. The mobile computerized electronic apparatus of claim 172, further comprising:
a first radio frequency interface in data communication with the digital processing apparatus and the at least one computer program; and
a second radio frequency interface in data communication with the digital processing apparatus and the at least one computer program, the at least one computer program further configured to cause the first radio frequency interface to exchange data with a portable radio frequency device carried by the user when the portable radio frequency device is within communications range of the first radio frequency interface, the exchanged data enabling the user to actuate one or more functions of the mobile computerized electronic device via at least the second radio frequency interface, the actuation of one or more functions of the mobile computerized electronic device via at least the second radio frequency interface comprises actuation initiated by the user via at least one of the capacitive touch screen input and display device, and the speech processing apparatus; and
a Bluetooth-compliant radio frequency transceiver in data communication with the digital processing apparatus, the radio frequency transceiver configured to communicate with a complementary Bluetooth radio frequency transceiver of a personal electronic device in order to permit user data to be exchanged between the personal electronic device and mobile computerized electronic apparatus, the data exchanged between the personal electronic device and the mobile computerized electronic apparatus via the Bluetooth-compliant transceiver comprising music data formatted according a Motion Picture Experts Group Audio (MP3) format.

178. The mobile computerized electronic apparatus of claim 177, wherein:
the mobile computerized electronic apparatus is part of a land-mobile vehicle capable of moving to and from various locations;
the wireless interface compliant with an IEEE 802.11is configured to operate utilizing an orthogonal frequency division multiplexing (OFDM) modulation scheme; and
the cellular wireless interface comprises an interface also is configured to operate utilizing an OFDM modulation scheme; and
wherein the OFDM modulation scheme of at least one of the 802.11-complaint and cellular interfaces is selected to at least mitigate radio frequency interference with one or more external radio frequency sources.

179. The mobile computerized electronic apparatus of claim 177, wherein:
the mobile computerized electronic apparatus is part of a land-mobile vehicle capable of moving to and from various locations;
the wireless interface compliant with an IEEE 802.11is configured to operate utilizing an orthogonal frequency division multiplexing (OFDM) modulation scheme and a binary phase shift keying (BPSK) modulation; and
the cellular wireless interface comprises a Third Generation (3G) wireless interface compliant with at least one of a 3GPP (Third Generation Partnership Project) and UMTS (Universal Mobile Telecommunications System) standard;
the first radio frequency interface comprises a radio frequency ID (RFID)-based radio frequency interface comprising an interrogator apparatus capable of interrogating the portable radio frequency device when the portable radio frequency device is within the communications range; and
the second radio frequency interface comprises apparatus thereof configured to implement a security policy so as to prevent surreptitious interception or use of data transmitted from the second radio frequency interface, the security policy comprising at least one of (i) encryption and/or (ii) a challenge-based protocol utilizing at least one randomized data value (RAND).

180. Mobile computerized electronic apparatus configured to enable provision of one or more location-based services to a user thereof via one or more of a plurality of wireless interfaces, and without the user having to know or manually enter an address of the mobile electronic apparatus, the computerized electronic apparatus comprising:
means for digital data processing;
a capacitive touch screen input and display device means in data communication with the means for digital data processing;
a cellular wireless interface means in data communication with the means for digital data processing and configured to transmit data wirelessly from the mobile computerized electronic apparatus to a receiver;
a wireless interface compliant with an IEEE 802.11 standard and in data communication with the means for digital data processing and configured to transmit data wirelessly from the mobile computerized electronic apparatus to a receiver;
a global positioning system (GPS)-based wireless receiver apparatus in data communication with the means for digital data processing, the receiver apparatus configured to generate data relating to a location of the mobile computerized electronic apparatus;

speech processing apparatus in data communication with the means for digital data processing and comprising at least one speech processing computer program operative to run thereon, the at least one speech processing computer program operative to recognize one or more words within a speech input of the user;

a first radio frequency interface means in data communication with the means for digital data processing and the at least one computer program;

a second radio frequency interface in data communication with the means for digital data processing and the at least one computer program, the at least one computer program further configured to cause the first radio frequency interface means to exchange data with a portable radio frequency device carried by the user when the portable radio frequency device is within communications range of the first radio frequency interface means, the exchanged data enabling the user to actuate one or more functions of the mobile computerized electronic device via at least the second radio frequency interface, the actuation of one or more functions of the mobile computerized electronic device via at least the second radio frequency interface comprises actuation initiated by the user via at least one of the capacitive touch screen input and display device means, and the speech processing apparatus;

a Bluetooth-compliant radio frequency transceiver in data communication with the means for digital data processing, the Bluetooth-compliant radio frequency transceiver configured to communicate with a complementary Bluetooth radio frequency transceiver of a personal electronic device in order to permit user data to be exchanged between the personal electronic device and mobile computerized electronic apparatus, the data exchanged between the personal electronic device and the mobile computerized electronic apparatus via the Bluetooth-compliant transceiver comprising music data formatted according a Motion Picture Experts Group Audio (MP3) format;

a universal serial bus (USB) interface in data communication with the means for digital data processing, the USB interface configured to communicate with a personal electronic device in order to permit user data to be transferred from the personal electronic device and mobile computerized electronic apparatus;

a storage device in data communication with the means for digital processing, the storage device comprising: (i) at least one first computer program operative to run on said means for digital data processing, said at least one first computer program configured to, when executed:
  encode one or more electronic messages for delivery to a first remote network server, the one or more electronic messages including at least a portion of the data relating to the location of the mobile computerized electronic apparatus generated by the GPS-based receiver; and
  transmit the one or more electronic messages to the first remote network server via at least one of the cellular wireless interface means and/or the 802.11-compliant interface in order to enable the provision of a location-based service to the user of the mobile computerized electronic device, the provision of the location-based service based at least in part on the one or more electronic messages;

and (ii) at least one second computer program operative to run on said means for digital data processing, said at least one second computer program configured to, when executed:
  encode one or more second electronic messages for delivery to a second remote network server, the one or more second electronic messages comprising data relating to at least a portion of the one or more recognized words; and
  transmit the one or more second electronic messages to the second remote network server via at least one of the cellular wireless interface means and/or the 802.11-compliant interface in order to enable the provision of a content data delivery service to the user of the mobile computerized electronic device;

wherein:

the at least one computer program operative to run on said means for digital data processing comprises an application computer program having at least one theme, the at least one theme comprising entertainment, and the provision of the content data delivery service to the user of the mobile computerized electronic device comprises streaming of content data via the cellular wireless interface from the second remote network server or a proxy thereof, the streamed content data comprising music data encoded according to at least a lossy compression format and transmitted over the Internet using at least a transport control protocol (TCP);

the at least one computer program operative to run on said means for digital data processing further comprises an application computer program having at least one theme, the at least one theme comprising Internet access, the application computer program further comprising access for the user to at least one Internet search engine using at least the capacitive touch screen input and display device means, and the provision of the location-based service comprises download of data via from a service provider Internet website, at least a portion of the downloaded data configured based at least in part on the at least a portion of the data relating to the location;

the mobile computerized electronic apparatus is part of a land-mobile vehicle capable of moving to and from various locations;

the wireless interface compliant with an IEEE 802.11 is configured to operate utilizing an orthogonal frequency division multiplexing (OFDM) modulation scheme; and the cellular wireless interface comprises at least one of (i) a Third Generation (3G) wireless interface compliant with at least one of a 3GPP (Third Generation Partnership Project) and UMTS (Universal Mobile Telecommunications System) standard, and/or (ii) a wireless interface configured to operate utilizing an orthogonal frequency division multiplexing (OFDM) modulation scheme; and the first radio frequency interface means comprises a radio frequency ID (RFID)-based radio frequency interface comprising an interrogator apparatus capable of interrogating the portable radio frequency device when the portable radio frequency device is within the communications range.

181. A method of providing a service to a user via at least a mobile electronic device such that the user does not need to know an address of a location where the service is to be provided, the mobile electronic device comprising a handheld mobile wireless-enabled device having at least a digital processing apparatus, an assisted global positioning system (A-GPS)-based receiver apparatus configured to generate location-related data, a wireless interface in data communication with the digital processing apparatus, a storage device configured to store at least a portion of an application computer program thereon, the storage device in data communication with the digital processing apparatus, and an input device in data communication with the digital processing apparatus, the method comprising:

receiving at the at least portion of the application computer program a user input, the user input relating to a desired service to be provided to the user at a then-current current location of the user and the mobile electronic device, the desired service relating to an associated transportation modality;

receiving at the at least portion of the application computer program location-related data generated by the A-GPS-based receiver apparatus, the location-related data relating to the then-current location;

utilizing at least the received location-related data to provide the desired service to the user at the then-current location, the provision of the service further comprising at least receipt of one or more messages from a network entity relating to the desired service, the one or more messages received by the at least portion of the application computer program via the wireless interface.

182. The method of claim 111, wherein the transportation modality comprises an automobile.

183. The method of claim 182, wherein:

the at least portion of the application computer program comprises a transportation-themed application computer program rendered in a Java-based programming language and downloaded to the mobile electronic device after manufacture;

the mobile device further comprises a capacitive touch-screen input and display device which comprises the input device;

the at least portion of the application computer program is configured to generate one or more soft function keys on a display of the capacitive touch screen input and display device, the one or more soft function keys enabling the user to provide the user input by way of one or more touches of one or more areas of the display corresponding to respective ones the one or more soft functions keys.

184. The method of claim 182, wherein the network entity is in at least wireless communication with the transportation modality.

185. The method of claim 184, wherein the network entity comprises a server apparatus in data communication with an internetwork, the server apparatus comprising a proxy for the transportation modality.

186. The method of claim 184, wherein the network entity comprises a server apparatus comprising at least one storage apparatus in data communication therewith, the storage apparatus comprising account data for a plurality of individual users, the account data accessible by the server apparatus at least in response to a user's request for the service.

187. The method of claim 186, wherein the providing the desired service to the user at the then-current location further comprises generation and transmission to the server apparatus via the wireless interface of the mobile electronic device at least one message, the at least one message comprising data enabling the server apparatus to access account data for the user.

188. The method of claim 186, wherein the providing the desired service to the user at the then-current location further comprises generation and transmission to the server apparatus via the wireless interface of the mobile electronic device at least one message, the at least one message comprising data enabling the server apparatus to authenticate the user.

189. The method of claim 186, further comprising establishing a secure sockets layer (SSL)-enabled session between the server apparatus and the at least portion of the application computer program so as to protect sensitive data relating to the user or the user's account during transmission between the server apparatus and the mobile electronic device.

190. The method of claim 181, wherein the desired service relating to the transportation modality comprises providing information enabling the user to converge with a location of the transportation modality.

191. The method of claim 181, further comprising receiving, at the mobile electronic device, at least one message indicating an estimated time of completion of a service being provided relating to the transportation modality.

192. The method of claim 191, wherein the service being provided relating to the transportation modality comprises at least one of a testing service or a maintenance service.

193. The method of claim 191, further comprising receiving, at the mobile electronic device, at least one message indicating an estimated time of completion of a service being provided relating to the transportation modality.

194. A method of providing a service to a user via at least a mobile computerized electronic apparatus such that the user does not need to know an address of a location where the service is desired to be provided, the mobile computerized electronic apparatus comprising at least a digital processing apparatus, a global positioning system (GPS)-based receiver apparatus configured to generate location-related data, a wireless interface in data communication with the digital processing apparatus, a storage device comprising at least one computer program thereon, the storage device in data communication with the digital processing apparatus, and an input device in data communication with the digital processing apparatus, the method comprising:

utilizing the at least one computer program to receive location-related data, the location-related data generated by the GPS-based receiver apparatus based on a then-current location of the mobile computerized electronic apparatus;

utilizing the at least one computer program to generate at least one message for transmission to a remote entity, the at least one message comprising at least a portion of the location-related data based on the then-current location; and utilizing the at least one computer program to cause transmission of the at least one message to the remote entity via at least the wireless interface, the at least one message configured to at least enable provision of the service for the user at the desired location.

195. The method of claim 194, wherein the service comprises a service provided at least in part by an automobile transportation modality.

196. The method of claim 195, wherein the mobile computerized electronic apparatus is at least disposed within the automobile transportation modality.

197. The method of claim 194, wherein the service comprises delivery of data related to the user or transportation modality thereof to the user at the desired location.

198. The method of claim 194, wherein:

the transmission via the wireless interface comprises transmission via a cellular wireless interface comprising at least one of a Third Generation Project Partnership (3GPP) compliant interface and/or an interface utilizing an orthogonal frequency division multiplexing (OFDM) modulation scheme;

the remote entity comprises a handheld smartphone of the user disposed at the desired location and also comprising:
- a cellular wireless interface comprising at least one of a Third Generation Project Partnership (3GPP) compliant interface and/or an interface utilizing an orthogonal frequency division multiplexing (OFDM) modulation scheme;
- an transportation-theme based application computer program rendered in a Java-based programming language and configured to receive the at least one message and utilize at least the at least portion of the location-related data to provide the service.

199. The method of claim 194, wherein the causing transmission of the at least one message to the remote entity comprises transmitting the at least one message substantially automatically based at least on receipt of an electronic message originated from the remote entity.

200. The method of claim 194, wherein the transmission of the at least one message to the remote entity comprises transmitting the at least one message to an electronic network proxy agent, the electronic network proxy agent being a proxy agent for the user, the electronic network proxy agent configured to transmit one or more messages to the remote entity, the one or more message transmitted to the remote entity comprising at least a portion of the at least portion of location-related data based on the then-current location provided with the at least one message received by the electronic proxy agent from the mobile computerized electronic apparatus, the proxy agent further configured to access cloud-based account data specific to the user and previously supplied so as to enable provision of the service to the user.

201. The method of claim 194, wherein:
- the mobile computerized electronic apparatus further comprises a capacitive touch-screen input and display device in data communication with the digital processing apparatus, the input device being part of the capacitive touch-screen input and display device; and
- the at least one computer program is configured to generate one or more soft function keys on a display of the capacitive touch screen input and display device, the one or more soft function keys enabling the user to provide a user input by way of one or more touches of one or more areas of the display corresponding to respective ones the one or more soft functions keys, the input causing at least instantiation of a window or display element via an application computer program running on the remote entity.

202. The method of claim 194, wherein the service comprises a service provided at least in part by an automobile transportation modality, the service comprising providing data enabling the user to physically interface with the transportation modality.

203. The method of claim 202, further comprising generating at, and transmitting from, the mobile computerized electronic apparatus, at least one message indicating an estimated time of completion of a service being provided relating to the transportation modality.

204. The method of claim 203, wherein the service being provided relating to the transportation modality comprises at least one of a testing service or a maintenance service.

* * * * *